US012707071B2

(12) United States Patent
Deshpande

(10) Patent No.: US 12,707,071 B2
(45) **Date of Patent: *Aug. 11, 2026**

(54) METHOD FOR SIGNALING A STEP-WISE TEMPORAL SUB-LAYER ACCESS SAMPLE

(71) Applicant: DOLBY INTERNATIONAL AB, Dublin (IE)

(72) Inventor: Sachin G. Deshpande, Camas, WA (US)

(73) Assignee: DOLBY INTERNATIONAL AB, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 19/001,096

(22) Filed: Dec. 24, 2024

(65) Prior Publication Data

US 2025/0133225 A1 Apr. 24, 2025

Related U.S. Application Data

(63) Continuation of application No. 18/515,746, filed on Nov. 21, 2023, now Pat. No. 12,219,161, which is a (Continued)

(51) Int. Cl.
*H04N 19/31* (2014.01)
*H04N 1/31* (2006.01)
(Continued)

(52) U.S. Cl.
CPC ............... *H04N 19/31* (2014.11); *H04N 1/31* (2013.01); *H04N 19/172* (2014.11);
(Continued)

(58) Field of Classification Search
CPC ........ H04N 1/31; H04N 19/172; H04N 19/31; H04N 21/234327; H04N 21/23438; H04N 21/2358; H04N 21/234381
(Continued)

(56) References Cited

U.S. PATENT DOCUMENTS 6,700,933 B1 3/2004 Wu et al.
10,531,106 B2 * 1/2020 Deshpande .... H04N 21/234381
(Continued)

FOREIGN PATENT DOCUMENTS

CN 1922881 2/2007
CN 1973545 5/2007
(Continued)

OTHER PUBLICATIONS

Anonymous: "Text of ISO/IEC 14496-15:2010 1-5, 7-9 PDAM 2 Carriage of High- Efficiency Video Coding (HEVC)," 100. MPEG Meeting; Apr. 30, 2012-May 4, 2012; Geneva; (Motion Picture Expert Group or ISO/IEC JTC1/SC29/WG11), No. N12647, May 8, 2012, XP030019121, Section 5.2.10.

(Continued)

*Primary Examiner* — Christopher S Kelley
*Assistant Examiner* — Ana Picon-Feliciano
(74) *Attorney, Agent, or Firm* — Fish & Richardson P.C.

(57) ABSTRACT

An electronic device for encoding a picture is described. The electronic device includes a processor and instructions stored in memory that are in electronic communication with the processor. The instructions are executable to encode a step-wise temporal sub-layer access (STSA) sample grouping. The instructions are further executable to send and/or store the STSA sample grouping.

13 Claims, 12 Drawing Sheets

Related U.S. Application Data continuation of application No. 17/233,918, filed on Apr. 19, 2021, now Pat. No. 11,871,014, which is a continuation of application No. 16/727,154, filed on Dec. 26, 2019, now Pat. No. 10,986,355, which is a continuation of application No. 14/882,641, filed on Oct. 14, 2015, now Pat. No. 10,531,106, which is a continuation of application No. 13/633,784, filed on Oct. 2, 2012, now abandoned.

(51) Int. Cl.
*H04N 19/172* (2014.01)
*H04N 21/2343* (2011.01)
*H04N 21/235* (2011.01)

(52) U.S. Cl.
CPC ............... *H04N 21/234327* (2013.01); *H04N 21/234381* (2013.01); *H04N 21/2358* (2013.01)

(58) Field of Classification Search
USPC .......................... 375/240.01, 240.13, 240.19
See application file for complete search history.

(56) References Cited

U.S. PATENT DOCUMENTS

| | | | | |
|---|---|---|---|---|
| 10,986,355 | B2 * | 4/2021 | Deshpande ........ | H04N 21/2358 |
| 11,871,014 | B2 * | 1/2024 | Deshpande .... | H04N 21/234381 |
| 12,219,161 | B2 * | 2/2025 | Deshpande ............ | H04N 19/31 |
| 2007/0016594 | A1 | 1/2007 | Visharam et al. | |
| 2007/0020001 | A1 | 1/2007 | Tanabe | |
| 2007/0110150 | A1 | 5/2007 | Wang et al. | |
| 2009/0003439 | A1 | 1/2009 | Wang et al. | |
| 2010/0153395 | A1 | 6/2010 | Hannuksela et al. | |
| 2012/0102042 | A1 | 4/2012 | Flick et al. | |
| 2012/0183076 | A1 | 7/2012 | Boyce et al. | |
| 2014/0079140 | A1 * | 3/2014 | Wang ................... | H04N 19/197 375/240.26 |
| 2014/0092953 | A1 | 4/2014 | Deshpande | |
| 2015/0131744 | A1 | 5/2015 | Samuelsson et al. | |
| 2015/0189299 | A1 | 7/2015 | Deshpande | |
| 2016/0037175 | A1 | 2/2016 | Deshpande | |
| 2020/0145679 | A1 | 5/2020 | Deshpande | |
| 2021/0329277 | A1 | 10/2021 | Deshpande | |
| 2024/0098286 | A1 | 3/2024 | Deshpande | |

FOREIGN PATENT DOCUMENTS

| | | |
|---|---|---|
| CN | 101690229 | 3/2010 |
| JP | 2009-502055 | 1/2009 |
| WO | WO 2010/140867 | 12/2010 |
| WO | WO 2014/002469 | 1/2014 |

OTHER PUBLICATIONS

Bross et al., "High-efficiency video coding (HEVC) text specification draft 8," JCTVC-J1003 d7, Stockholm, Jul. 2012.
European Search Report in European Application No. 13843656.3, dated Apr. 7, 2018, 8 pages.
European Search Report in European Application No. 18167662.8, dated May 22, 2018, 6 pages.
European Search Report in European Application No. 19159367.2, dated Jun. 18, 2019, 5 pages.
Hendry et al., "AHG 9: On non-referenced TSA and STSA NAL units," 11. JCT-VC Meeting; 102. Mpeg Meeting; Oct. 10, 2012-Oct. 19, 2012; Shanghai; (Joint Collaborative Team on Video Coding of ISO/IEC JTC1/SC29/WG11 and ITU-T SG.16); JCTVC-K0164, Oct. 1, 2012, XP030113046.
Information technology—Coding of audio-visual objects—Part 15: Carriage of NAL unit structured video in the ISO Base Media File Format, Amendment 2: Carriage of high-efficiency video coding (HEVC), Jul. 2012, Stockholm.
International Search Report issued for International Application No. PCT/JP2013/005888 on Dec. 24, 2013.
ISO/ IEC 14496-15, "Carriage of NAL unit structured video in the ISO Base Media File Format", Jul. 2012, Stockholm.
PCT International Preliminary Report on Patentability Chapter II in International Appln. No. PCT/JP2013/005888, dated Oct. 14, 2014, 12 pages.
Portion of Specification of U.S. Appl. No. 61/588,800.
Deshpande (sharp): "On Signaling STSA Samples in HEVC File Format," Motion picture expert group or ISO/IEC JTC1/SC29/WG: Shanghai, Oct. 15-Oct. 19, 2012, [M26650].
Deshpande, "AHG9: On Gradual Temporal Layer Access", Joint Collaborative Team on Video Coding (JCT-VC) of ITU-T SG16 WP3 and ISO/IEC JTC1/SC29/WG11 10th Meeting: Stockholm, Sweden, Jul. 11-Jul. 20, 2012, [JCTVC-J0305].
Written Opinion of the International Search Report in International Appln. No. PCT/JP2013/005888, mailed on Dec. 24, 2013, 4 pages.
Yan et al., "Flexible prediction structure for multi-view video coding," Chinese Journal of Image and Graphics, 2012, 730-735 (Summary only).

* cited by examiner

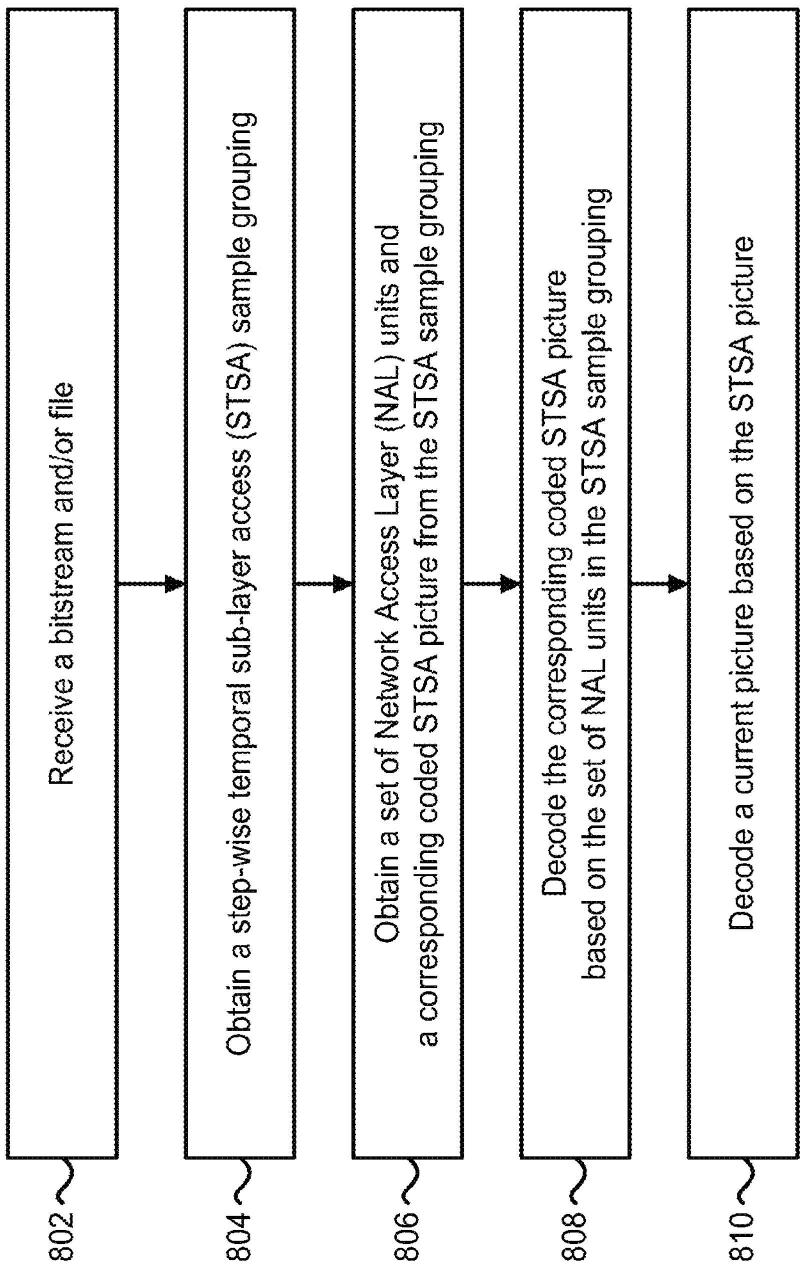
FIG. 8

METHOD FOR SIGNALING A STEP-WISE TEMPORAL SUB-LAYER ACCESS SAMPLE

CROSS-REFERENCE TO RELATED APPLICATIONS

This application is a continuation of U.S. application Ser. No. 18/515,746, filed Nov. 21, 2023, which is a continuation of U.S. application Ser. No. 17/233,918, filed Apr. 19, 2021, now U.S. Pat. No. 11,871,014, which is a continuation of U.S. application Ser. No. 16/727,154, filed Dec. 26, 2019, now U.S. Pat. No. 10,986,355, which is a continuation of U.S. application Ser. No. 14/882,641, filed Oct. 14, 2015, now U.S. Pat. No. 10,531,106, which is a continuation of U.S. application Ser. No. 13/633,784, filed Oct. 2, 2012, now abandoned. The entire contents of each of the foregoing applications are herein incorporated by reference.

TECHNICAL FIELD

The present disclosure relates generally to electronic devices. More specifically, the present disclosure relates to methods for signaling a step-wise temporal sub-layer access sample.

BACKGROUND

Electronic devices have become smaller and more powerful in order to meet consumer needs and to improve portability and convenience. Consumers have become dependent upon electronic devices and have come to expect increased functionality. Some examples of electronic devices include desktop computers, laptop computers, cellular phones, smart phones, media players, integrated circuits, etc.

Some electronic devices are used for processing and displaying digital media. For example, portable electronic devices now allow for digital media to be consumed at almost any location where a consumer may be. Furthermore, some electronic devices may provide download or streaming of digital media content for the use and enjoyment of a consumer.

The increasing popularity of digital media has presented several problems. For example, efficiently representing high-quality digital media for storage, transmittal and playback presents several challenges. As can be observed from this discussion, systems and methods that represent digital media more efficiently may be beneficial.

BRIEF DESCRIPTION OF THE DRAWINGS

FIG. 8 is a flow diagram illustrating a more specific configuration of a method for receiving a step-wise temporal sub-layer access (STSA) sample grouping;

DETAILED DESCRIPTION

Figure 1:
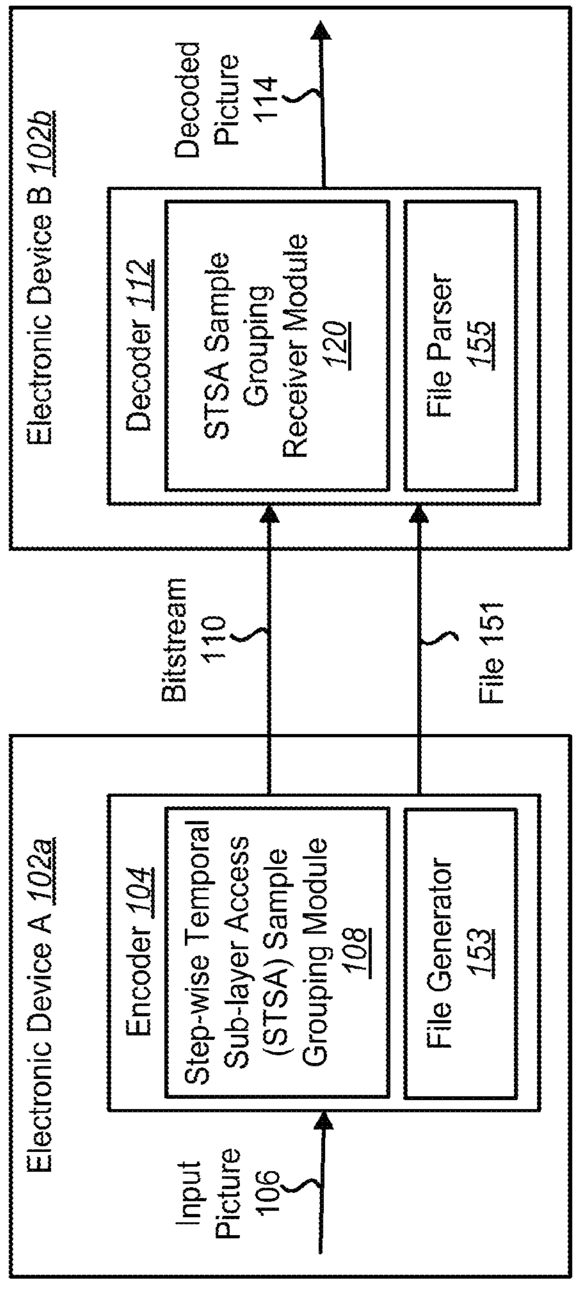
FIG. 1 is a block diagram illustrating an example of one or more electronic devices in which systems and methods for signaling a step-wise temporal sub-layer access (STSA) sample grouping may be implemented.

An electronic device for encoding a picture is described. The electronic device includes a processor and instructions stored in memory that are in electronic communication with the processor. The instructions are executable to encode a step-wise temporal sub-layer access (STSA) sample grouping. The instructions are further executable to send and/or store the STSA sample grouping.

Sending the STSA sample grouping may include storing the STSA sample grouping in a recordable storage medium. The recordable storage medium may be a file. Encoding the STSA sample grouping may include encoding the STSA sample grouping based on an ISO base media file format. The ISO base media file format may have been extended to support high efficiency video coding (HEVC) video streams. Sending the STSA sample grouping may include sending the STSA sample grouping in an ISO base media file format.

The STSA sample grouping may indicate STSA samples. The STSA sample grouping may indicate a next temporal layer switching point at the same temporal layer. The next temporal layer switching point may indicate a number of samples to the next temporal layer switching point at the same temporal layer.

The STSA sample grouping may indicate a next temporal layer switching point at a higher temporal layer. The next temporal layer switching point may indicate a number of samples to the next temporal layer switching point at the higher temporal layer. The higher temporal layer may be a temporal layer with a temporal identifier (ID) that is one temporal ID greater than the temporal ID of a current sample. The higher temporal layer may be a temporal layer with a temporal ID that has a greater temporal ID than the temporal ID of a current sample.

The STSA sample grouping may be sent in a sample group description box (SGPD). The SGPD may include one of a next STSA upswitching distance parameter, a next STSA sample distance parameter and a type temporal switching access (TSA) flag. The upswitching distance parameter may be next_stsa_upswitching_distance, the next STSA sample distance parameter may be next_stsa_sample_distance and the type TSA flag may be typeTSAFlag. The type TSA flag value may indicate if a sample in the STSA sample grouping is a TSA sample or a STSA sample. The STSA picture may provide temporal layer switching functionality to a temporal layer to which the STSA picture belongs.

An electronic device for decoding a picture is also described. The electronic device includes a processor and instructions stored in memory that are in electronic communication with the processor. The instructions are executable to receive one of a bitstream and a recordable storage medium. The instructions are also executable to obtain a step-wise temporal sub-layer access (STSA) sample grouping. The instructions are further executable to decode the STSA sample grouping. The instructions are also executable to determine when to switch to a new temporal layer based on the STSA sample grouping.

The recordable storage medium may be a file. Receiving the STSA sample grouping may include receiving the STSA sample grouping in an ISO base media file. Decoding the STSA sample grouping may include decoding the STSA sample grouping based on an ISO base media file format. The ISO base media file format may have been extended to support high efficiency video coding (HEVC) video streams.

The STSA sample grouping may indicate STSA samples. The STSA sample grouping may indicate a next temporal layer switching point at the same temporal layer. The next temporal layer switching point may indicate a number of samples to the next temporal layer switching point at the same temporal layer.

The STSA sample grouping may indicate a next temporal layer switching point at a higher temporal layer. The next temporal layer switching point may indicate a number of samples to the next temporal layer switching point at the higher temporal layer. The higher temporal layer may be a temporal layer with a temporal identifier (ID) that is one temporal ID greater than the temporal ID of a current sample. The higher temporal layer may be a temporal layer with a temporal ID that has a greater temporal ID than the temporal ID of a current sample.

The STSA sample grouping may be sent in a sample group description box (SGPD). The SGPD may include one of a next STSA upswitching distance parameter, a next STSA sample distance parameter and a type temporal switching access (TSA) flag. The upswitching distance parameter may be next_stsa_upswitching_distance, the next STSA sample distance parameter may be next_stsa_sample_distance and the type TSA flag may be typeTSAFlag.

The type TSA flag value may indicate if a sample in the STSA sample grouping is a TSA sample or a STSA sample. The STSA picture may provide temporal layer switching functionality to a temporal layer to which the STSA picture belongs.

A method for encoding a picture is also described. A step-wise temporal sub-layer access (STSA) sample grouping is encoded. The STSA sample grouping is sent.

A method for decoding a picture is also described. A bitstream and/or a recordable storage medium is received. A step-wise temporal sub-layer access (STSA) sample grouping is obtained. The STSA sample grouping is decoded. It is determined when to switch to a new temporal layer based on the STSA sample grouping.

The systems and methods disclosed herein describe approaches signaling a step-wise temporal sub-layer access (STSA) sample grouping. For example, some configurations described herein include devices and methods for signaling STSA sample groupings using a corresponding Network Access Layer (NAL) unit. A STSA sample grouping may include one or more STSA samples.

In some known configurations, such as in Benjamin Bros et al., "High efficiency video coding (HEVC) text specification draft 8," JCTVC-J1003_d7, Stockholm, July 2012 (hereinafter "HEVC Draft 8"), STSA pictures are described. HEVC Draft 8 also describes Network Access Layer (NAL) unit types corresponding to a STSA picture. In some cases, the STSA picture may be called a gradual temporal layer access (GTLA) picture.

The High-Efficiency Video Coding (HEVC) standard offers increased coding efficiency and enhanced robustness. As such, ISO/IEC 14496-15, "Carriage of NAL unit structured video in the ISO Base Media File Format," Stockholm, July 2012 (hereinafter "ISO/IEC 14496-15"), defines carriage of NAL unit structured video in the ISO Base Media File Format. Also, information technology, coding of audio-visual objects, "Part 15: Carriage of NAL unit structured video in the ISO Base Media File Format, AMENDMENT 2: Carriage of high efficiency video coding (HEVC)," Stockholm, July 2012, defines Carriage of high efficiency video coding (HEVC) video streams. The storage of HEVC content uses the existing capabilities of the ISO base media file format but also defines extensions to support features of the HEVC codec. For example, ISO/IEC 14496-15 provides one approach to NAL unit structured video carriage in the ISO base media file format. Approaches relating to the HEVC carriage are also described. (See "Part 15: Carriage of NAL unit structured video in the ISO Base Media File Format, AMENDMENT 2: Carriage of high efficiency video coding (HEVC)", Stockholm, July 2012.)

One of the HEVC features supported by the ISO base media file format includes parameter sets. For example, a video parameter set (VPS) mechanism, a sequence parameter set (SPS) mechanism and a picture parameter set (PPS) mechanism may decouple the transmission of infrequently changing information from the transmission of a coded block data. Each slice containing a coded block data may reference the PPS containing its decoding parameters. In turn, the PPS may reference a SPS that includes sequence level decoding parameter information. The SPS may reference a VPS that includes global decoding parameter information, such as across layers or view in potential scalable and 3DV extensions. In addition, HEVC may also support adaptation parameter sets (APS), which include decoding parameters that may supposed to change more frequently than coding parameters in PPS. An adaptation parameter set (APS) may also be referenced by a slice, when needed.

Additional tools, such as sample groupings, may also be included for supporting of HEVC elements in the ISO base media file format. For example, a temporal scalability sample grouping may provide a structuring and grouping mechanism to indicate the association of access units with different hierarchy levels of temporal scalability. As another example, a temporal sub-layer access sample grouping may provide a structuring and grouping mechanism to indicate the identification of access units as temporal sub-layer access (TSA) samples. In some case, the temporal layers may be called temporal sub-layers, or sub-layers. Similarly, temporal sub-layer access (TSA) samples may be called temporal layer access (TLA) samples.

In some configurations a, step-wise temporal sub-layer access (STSA) sample grouping may also be added to provide a structuring and grouping mechanism to indicate the identification of access units as STSA samples. For example, the STSA samples grouping may indicate STSA samples.

In some configurations, a temporal sub-layer access (TSA) type sample grouping may be added to provide a structuring and grouping mechanism to indicate the identification of access units as TSA and STSA samples. For example, the TSA type sample grouping may indicate both TSA and STSA samples. Further information in the sample grouping may distinguish between TSA sample groupings and STSA sample groupings. Further detail regarding TSA sample groups, STSA sample groups and TSA sample groups will be described below.

In some configurations, temporal sub-layer access (TSA) or sub-layer pictures may be currently signaled in a bitstream. TSA pictures unify the signaling of Clean Random Access (CRA) pictures and temporal sub-layer switching points. A CRA picture may indicate a random access point (RAP), or a point from which a decoder can start to decode without having access to pictures that precedes the CRA picture in decoding order. In some cases, a CRA picture may include intra-prediction slices (I-slices) that are decoded using intra predictions.

As used herein, the term “temporal layer” refers to all pictures with the same temporal identifier (temporal_id, tId or TemporalId), or all pictures on the same temporal level. Additional detail regarding temporal layers will be described below in greater detail in connection with FIG. 2.

rations. It should be noted that in some configurations, NAL unit types 0 and 33-63 may be used as determined by various applications. NAL unit types 0 and 33-63 may be reserved for future use. In some configurations described herein, a decoder may ignore contents of NAL units that use reserved or unspecified values of NAL unit types.

Examples of NAL unit type codes and NAL unit type classes that may be implemented in accordance with the systems and methods disclosed herein are included in Table 1 below. It may be noted that some configurations may include similar and different fields to those described below.

In some configurations, some or all of the NAL fields in Table 1 may be examples of different NAL unit types. In some configurations, certain NAL unit types may be associated with different fields and syntax structures associated with one or more pictures. Further explanations of one or more fields are included below. It should be noted that Table 1 below includes abbreviations for broken link access (BLA), random access point (RAP), tagged for discard (TFD) and instantaneous decoding refresh (IDR) pictures.

TABLE 1

| NAL Unit Type | Content of NAL Unit | RBSP Syntax Structure |
|---|---|---|
| 0 | Unspecified | N/A |
| 1, 2 | Coded slice of a non-TSA, non-STSA trailing picture | slice_layer_rbsp( ) |
| 3, 4 | Coded slice of a TSA picture | slice_layer_rbsp( ) |
| 5, 6 | Coded slice of an STSA picture | slice_layer_rbsp( ) |
| 7, 8, 9 | Coded slice of a BLA picture | slice_layer_rbsp( ) |
| 10, 11 | Coded slice of an IDR picture | slice_layer_rbsp( ) |
| 12 | Coded slice of a CRA picture | slice_layer_rbsp( ) |
| 13 | Coded slice of a DLP picture | slice_layer_rbsp( ) |
| 14 | Coded slice of a TFD picture | slice_layer_rbsp( ) |
| 15 . . . 24 | Reserved | |
| 25 | Video parameter set | video_parameter_set_rbsp( ) |
| 26 | Sequence parameter set | seq_parameter_set_rbsp( ) |
| 27 | Picture parameter set | pic_parameter_set_rbsp( ) |
| 28 | Access unit delimiter | access_unit_delimiter_rbsp( ) |
| 29 | End of sequence | end_of_seq_rbsp( ) |
| 30 | End of bitsteam | end_of_bitstream_rbsp( ) |
| 31 | Filler data | filler_data_rbsp( ) |
| 32 | Supplemental enhancement information (SEI) | sei_rbsp( ) |
| 33 . . . 47 | Reserved | N/A |
| 48 . . . 63 | Unspecified | N/A |

A temporal sub-layer switching point is a picture that represents a point in the bitstream where it is possible to start decoding a larger number of temporal layers than what was decoded before the switching point. In other words, a temporal sub-layer switching point may indicate that pictures with a higher temporal ID than the current temporal ID may start to be decoded. In this case, the temporal sub-layer switching point is a temporal sub-layer up-switching point. As such, there is no picture following the switching point in both decoding order and display order that uses any picture that preceded the switching point in decoding order or display order. The temporal sub-layer switching point may be signaled using the ISO base media file format.

In one configuration, a STSA sample grouping may be signaled by a NAL unit type carriage using the ISO base media file format. In other configurations, a STSA sample grouping may be signaled by the HEVC carriage using the ISO base media file format.

In other configurations, a NAL unit type may specify the type of raw byte sequence payload (RBSP) data structure included in a NAL unit. In one example, a NAL unit that uses a NAL unit type equal to 0 or in the range of 33-63 may not affect the decoding process specified in various configu- Table 1 is organized into columns NAL unit type (nal_unit_type), content of NAL unit and RBSP syntax structure. NAL units may provide an indication of the type of data that will follow. For example, a NAL unit type of 5 or 6 may indicate data relating to a coded slice of an STSA picture may follow.

In Table 1, the syntax may include slice layer raw byte sequence payload (RBSP) syntax. Additionally or alternatively, the syntax may also include supplemental enhancement (SEI) information RBSP syntax. An SEI RBSP may include one or more SEI messages. Each SEI message may include variables specifying the type (e.g., payloadType) and size (e.g., payloadSize) of the SEI payload. The derived SEI payload size may be specified in bytes and may be equal to the number of RBSP bytes in the SEI payload.

In Table 1, when the value of NAL unit type is equal to 5 or 6 for a particular picture, that particular picture may be referred to as a step-wise temporal sub-layer access (STSA) picture. In some configurations, when the nal_unit_type is in the range of 3 to 6, inclusive (e.g., a coded slice of a TSA or STSA picture), Temporal ID may not be equal to 0.

A STSA picture may be a coded picture for which each slice has nal_unit_type equal to STSA_R or STSA_N.

STSA_R may indicate that a decoded STSA picture may serve as a reference to a subsequent decoded picture. STSA_N may indicate that a decoded STSA picture does not serves as a reference to any subsequent decoded picture. An STSA picture does not use pictures with the same Temporal ID as the STSA picture for inter prediction reference. Pictures following an STSA picture in decoding order with the same Temporal ID as the STSA picture do not use pictures prior to the STSA picture in decoding order with the same Temporal ID as the STSA picture for inter prediction reference. An STSA picture enables up-switching, at the STSA picture, to the sub-layer containing the STSA picture, from the immediately lower sub-layer. STSA pictures must have Temporal ID greater than 0.

It should be noted that RefPicSetStCurrBefore, RefPicSetStCurrAfter and RefPicSetLtCurr includes all reference pictures that may be used in inter prediction of the current picture and that may be used in inter prediction of one or more of the pictures following the current picture in decoding order.

When the current picture is an STSA picture, there may be no picture included in RefPicSetStCurrBefore, RefPicSetStCurrAfter or RefPicSetLtCurr that has Temporal_id equal to that of the current picture. When the current picture is a picture that follows, in decoding order, an STSA picture that has Temporal_id equal to that of the current picture, there may be no picture that has Temporal_id equal to that of the current picture included in RefPicSetStCurrBefore, RefPicSetStCurrAfter or RefPicSetLtCurr that precedes the STSA picture in decoding order.

In some configurations, the systems and methods disclosed herein describe a STSA picture. A STSA picture may be a coded picture for which each slice has NAL unit type equal to 5 or 6.

Signaling a step-wise temporal sub-layer access (STSA) sample grouping may provide advantages over signaling a temporal layer sample grouping. For example, a STSA sample grouping may provide clear markings and/or labeling of STSA samples as belonging to the STSA sample grouping. This in turn provides easy identification of the temporal layer switching points in the samples. Additional benefits and advantages will be described below.

In some configurations, the STSA sample grouping may be sent in the carriage of a NAL unit. The STSA sample grouping may be of a group of pictures stored using the ISO base media file format. The ISO base media file format may be specified according to ISO/IEC 14496-15. The ISO base media file format may also be extended to support the carriage of HEVC.

An advantage of signaling the STSA sample groupings in the ISO base media file format is that additional syntax elements may be defined for the STSA sample grouping. For example, one additional syntax element may provide the ability to know when a next temporal layer switching point will occur at the same temporal layer. This may be beneficial in determining when to adaptively switch to a new temporal layer.

Additionally, STSA pictures may provide the ability to increase the frame rate of a video in a step-by-step manner. For example, an electronic device 102 may start by receiving video only for the lowest temporal sub-layer. Then, after a period of time, based on its decoding ability and/or current CPU load and/or available bandwidth, the electronic device 102 may wait for a STSA picture at next higher temporal layer. Then, from that point onwards the electronic device 102 may start to decode the lowest temporal sub-layer and next higher temporal sub-layer. When the electronic device 102 encounters another STSA picture, for example, a STSA picture with an even higher temporal sub-layer, the electronic device 102 may decide to wait and not start decoding that higher temporal sub-layer if it had only recently up-switched to the current highest temporal sub-layer that it is decoding. In some cases, the decision to further up-switch immediately or to wait may be based on when the next STSA picture is going to occur. This information could be learnt from the additional syntax element, which provides the ability to know when a next temporal layer switching point will occur at the same temporal layer.

As another example, an additional syntax element may be defined for the STSA sample grouping that provides the ability to know when a next temporal layer up switching point (i.e., STSA sample for higher temporal ID) will occur at the higher temporal layer. This may be beneficial in allowing selection of desired frame rate in a step-by-step manner and for temporal up-switching.

In some systems and methods for signaling a STSA sample grouping described herein, one or more indicators may be implemented to indicate a STSA sample grouping and/or STSA picture in a bitstream. For example, in one configuration, a NAL unit may be employed to indicate a STSA picture in the bitstream.

Various configurations are now described with reference to the figures, where like reference numbers may indicate functionally similar elements. The systems and methods as generally described and illustrated in the figures herein could be arranged and designed in a wide variety of different configurations. Thus, the following more detailed description of several configurations, as represented in the figures, is not intended to limit scope, as claimed, but is merely representative of the systems and methods.

FIG. 1 is a block diagram illustrating an example of one or more electronic devices 102*a-b* in which systems and methods for signaling a step-wise temporal sub-layer access (STSA) sample grouping may be implemented. In this example, electronic device A 102*a* and electronic device B 102*b* are illustrated. However, it should be noted that one or more of the features and functionality described in relation to electronic device A 102*a* and electronic device B 102*b* may be combined into a single electronic device in some configurations.

Electronic device A 102*a* includes an encoder 104. Each of the elements included within electronic device A 102*a* (e.g., the encoder 104 and STSA sample grouping module 108) may be implemented in hardware, software or a combination of both.

Electronic device A 102*a* may obtain an input picture 106. The input picture 106 may be captured on electronic device A 102*a* using an image sensor, retrieved from memory and/or received from another electronic device.

The encoder 104 may include a STSA sample grouping module 108 and a file generator 153. As illustrated in FIG. 1, the STSA sample grouping module 108 and the file generator 153 may be part of the encoder 104.

In other configurations, the STSA sample grouping module 108 and/or the file generator 153 may be separate from encoder 304 and/or located on another electronic device 102. For example, the encoder 104 may be a HEVC encoder and the STSA sample grouping module 108 may reside in the file generator 153 located in the electronic device A 102 a separate from the encoder 104. In this example, the STSA sample grouping module 108 may use information from the HEVC encoder to identify STSA samples. In another example, the STSA sample grouping module 108 may parse the bitstream 110 created by the HEVC encoder and identify STSA pictures and samples from the bitstream 110.

The encoder 104 may encode the input picture 106 to produce encoded data, such as a sample. For example, the encoder 104 may encode a series of input pictures (e.g., video) to obtain a series of samples.

As used herein, the term "sample" may be used as provided in the ISO base media file format standard. A "sample" as defined by the ISO base media file format standard may refer to all the data associated with a single timestamp. Thus, no two samples within a track may share the same time-stamp. A "sample" as defined by the ISO base media file format standard may also correspond to an "access unit" as defined by the HEVC standard. For example, a sample may refer to a set of NAL units that are consecutive in decoding order and include exactly one coded picture. In addition to the coded slice NAL units of the coded picture, the sample may also include other NAL units not containing slices of the coded picture. The decoding of a sample always results in a decoded picture. A sample grouping may include one or more samples. A sample grouping may be an assignment of each sample in a track to be a member of one sample group, based on a grouping criterion. A sample group in a sample grouping is not limited to being contiguous samples and may include non-adjacent samples.

The encoder 104 may be a High Efficiency Video Coding (HEVC) encoder. In some configurations, the HEVC standard may define a storage format for video streams compressed using HEVC. This standard may be an extension of the ISO base media file format. In other words, the encoder 104 may encode the input picture 106 based on the ISO base media file format where the ISO base media file format has been extended to support HEVC video streams.

The encoder 104 may employ the use of known tools, such as parameter sets, temporal scalability sample groupings and temporal sub-layer access (TSA) sample groupings, to perform HEVC encoding. For example, a temporal scalability sample grouping may provide a structuring and grouping mechanism to indicate the association of access units with different hierarchy levels of temporal scalability. A temporal layer access sample grouping may provide a structuring and grouping mechanism to indicate the identification of access units as temporal sub-layer access (TSA) samples. In addition, in some case the temporal layer access (TLA) sample grouping may be called temporal sub-layer access (TSA) sample grouping.

Table 2 shows one example of a temporal layer sample group entry below.

Temporal Layer Sample Group Entry

TABLE 2

| | |
|---|---|
| Group Types: | 'tscl' |
| Container: | Sample Group Description Box ('sgpd') |
| Mandatory: | No |
| Quantity: | Zero or more |

In Table 2, the temporal layer sample group entry may define the temporal layer information for all samples in a temporal layer. Temporal layers may be numbered with non-negative integers. Each temporal layer may be associated with a particular value called a temporal ID (e.g., temporal_id). A temporal layer associated with a temporal_id value greater than zero may reference all temporal layers with lower temporal_id values. In other words, a temporal layer representation associated with a particular temporal_id value may include all temporal layers associated with temporal_id values equal to or less than the particular temporal_id value.

Listing 1 provides syntax that may be used in connection with the temporal layer sample group entry shown in Table 2.

Syntax

Listing 1

```
class TemporalLayerEntry( ) extends VisualSampleGroupEntry ('tscl')
{
  unsigned int(8) temporalLayerId;
  unsigned int(3) tlprofile_space;
  unsigned int(5) tlprofile_idc;
  unsigned int(16) tlconstraint_indicator_flags;
  unsigned int(8) tllevel_idc;
  unsigned int(32) tlprofile_compatibility_indications;
  unsigned int(16) tlMaxBitRate;
  unsigned int(16) tlAvgBitRate;
  unsigned int(8) tlConstantFrameRate;
  unsigned int(16) tlAvgFrameRate;
}
```

In Listing 1, temporalLayerId may give the ID of the current temporal layer. For all samples that are members of this sample group, the Video Coding Layer (VCL) NAL units may have temporal_id, as defined in ISO/IEC 23008-2, equal to temporalLayerId. tlprofile_space, tlprofile_idc, ticonstraint_flags, tllevel_idc and tlprofile_compatibility_indications may include the codes as defined in ISO/IEC 23008-10, for the representation of the temporal layer identified by temporalLayerId.

tlMaxBitrate may provide the maximum rate, in 1000 bits per second over any window of one second, for the representation of the temporal layer identified by temporalLayerId. tlAvgBitRate may provide the average bit rate in units of 1000 bits per second, for the representation of the temporal layer identified by temporalLayerId.

tlConstantFrameRate equal to 1 may indicate that the representation of the temporal layer identified by temporalLayerId has a constant frame rate. tlConstantFrameRate equal to 0 may indicate that the representation of the temporal layer identified by temporalLayerId may or may not be have constant frame rate. tlAvgFrameRate may provide the average frame rate, in units of frames/(256 seconds), for the representation of the temporal layer identified by temporalLayerId.

The encoder 104 may employ the use of additional tools, such as STSA temporal scalability sample groupings, to perform HEVC encoding. The STSA sample may provide a structuring and grouping mechanism to indicate the identification of access units as STSA samples. For example, the STSA samples grouping may indicate STSA samples.

In one configuration, a HEVC video track (i.e., video stream) may include zero or one instance of a Sample To Group Box with a grouping_type 'tlaw.' This Sample To Group Box instance may represent the marking of samples as STSA points. An accompanying instance of the Sample Group Description Box with the same grouping type may be present. Table 3 below shows one example of a step-wise temporal sub-layer sample group entry.

Step-Wise Temporal Sub-Layer Sample Group Entry

TABLE 3

| | |
|---|---|
| Group Types: | 'tlaw' |
| Container: | Sample Group Description Box ('sgpd') |
| Mandatory: | No |
| Quantity: | Zero or more |

In Table 3, the sample group may be used to mark step-wise temporal sub-layer access (STSA) samples. Listing 2 below provides one example of syntax that may be used in connection with the step-wise temporal sub-layer sample group entry shown in Table 3.

Syntax

Listing 2

```
class TemporalLayerEntry( ) extends VisualSampleGroupEntry ('tlaw')
{
}
```

Listing 3 below provides another example of syntax that may be used in connection with the step-wise temporal sub-layer sample group entry shown in Table 3.

Syntax

Listing 3

```
class TemporalLayerEntry( ) extends VisualSampleGroupEntry ('tlaw')
{
  unsigned int(8) next_stsa_upswitching_distance;
  unsigned int(8) next_stsa_sample_distance;
}
```

In Listing 3, next_stsa_upswitching_distance may indicate the number of samples of the temporal layer with temporal_id (tId) equal to tId+1 after which a STSA sample will occur at the temporal layer with temporal_id equal to tId+1. In other words, next_stsa_upswitching_distance may provide for the ability to know when a next temporal layer up switching point (i.e., STSA sample for a higher temporal ID) will occur at the higher temporal layer. This may be beneficial in determining a desired frame rate in a step-by-step manner and for temporal up-switching.

In some configurations, next_stsa_upswitching_distance values may be similarly indicated for all higher temporal layers with a temporal_id greater than tId (i.e., the temporal ID of the current temporal layer). Also, in some cases as used herein, a temporal layer may instead be called as a temporal sub-layer.

next_stsa_point_distance may indicate the number of samples of the temporal layer with temporal_id equal to tId (i.e., temporal_id of this sample) after which a step-wise temporal sub-layer access (STSA) sample will occur again at the current temporal layer with temporal_id equal to tId. In other words, next_stsa_point_distance may provide for the ability to know when a next temporal layer switching point will occur at the same temporal layer. This may be beneficial in determining when to adaptively switch to a new temporal layer. It should be noted that although the above description uses a group types of 'tlaw', some other name could be used to indicate the same purpose instead. For example, 'tsaw' or 'abcd' or 'zhgf' may be employed.

In another configuration, a HEVC video track (i.e., video stream) may include zero or one instance of a Sample To Group Box with a grouping_type 'tlas.' This Sample To Group Box instance may represent the marking of samples as temporal layer access points (or temporal sub-layer access points). An accompanying instance of the Sample Group Description Box with the same grouping type may be present. Table 4 below shows one example of a temporal layer sample group entry.

Temporal Layer Sample Group Entry

TABLE 4

| | |
|---|---|
| Group Types: | 'tlas' |
| Container: | Sample Group Description Box ('sgpd') |
| Mandatory: | No |
| Quantity: | Zero or more |

In Table 4, the sample group is used to mark temporal sub-layer access (TSA) and step-wise temporal sub-layer access (STSA) samples. Listing 4 provides syntax that may be used in connection with the temporal layer sample group entry shown in Table 4.

Syntax

Listing 4

```
class TemporalLayerEntry( ) extends VisualSampleGroupEntry ('tlas')
{
  unsigned int(1) typeTSAFlag;
}
```

In Listing 4, typeTSAFlag equal to 1 may indicate that the sample group is a temporal sub-layer access TSA sample. Otherwise, typeTSAFlag equal to 0 may indicate that the sample group is a step-wise temporal sub-layer access STSA sample. Alternatively, some other flag or indicator with pre-defined values to distinguish between TSA and STSA samples could be signaled in connection with the temporal layer sample group entry.

Returning to FIG. 1, the encoded data may be included in a bitstream 110. The encoder 104 may generate overhead signaling based on the input picture 106. It should be noted that the STSA sample grouping module 108 may be included within the encoder 104 in some configurations.

In some configurations, the STSA sample grouping module 108 may send or otherwise share the STSA sample grouping with one or more electronic devices 102. In one example, electronic device A 102*a* may send one or more STSA sample groupings to electronic device B 102*b*. The STSA sample grouping may be sent in an ISO base media file format. One benefit of generating a STSA sample grouping in ISO base media file format may include distinctly marking and/or labeling STSA samples as belonging to a particular sample grouping.

The encoder 104 (and STSA sample grouping module 108, for example) may produce a bitstream 110. The bitstream 110 may include encoded data based on the input picture 106. In one example, the bitstream 110 may include encoded picture data based on the input picture 106.

In some configurations, the encoder 104 may include a file generator 153. Encoded data may be stored and transmitted as a file 151. For example, the file generator 153 may store the bitstream 110 in a file format, such as the ISO base media file format. As such, information included in the bitstream 110, as described herein, may be stored and placed into a file 151.

In some configurations, the bitstream 110 may also include overhead data, such as slice header information, PPS information, SPS information, APS information, VPS information, etc. The bitstream 110 may also include other data, some examples of which are described herein. As additional input pictures 106 are encoded, the bitstream 110 may include one or more STSA sample grouping. Additionally or alternatively, the bitstream 110 may include other encoded data.

The bitstream 110 and/or file 151 including the bitstream information may be provided to a decoder 112. In one example, the bitstream 110 may be transmitted to electronic device B 102*b* using a wired or wireless link. In some cases, this may be done over a network, such as the Internet, Local Area Network (LAN) or other type of network for communicating between devices.

The file 151 may similarly be transmitted to electronic device 102*b*. In addition, the file 151 may be provided to the electronic device 102*b* in various ways, For example, the file 151 may be being copied from a server, mailed on a storage medium, transmitted electronically, sent in a message, etc.

As illustrated in FIG. 1, the decoder 112 may be implemented on electronic device B 102*b* separately from the encoder 104 on electronic device A 102*a*. It should be noted that in some configurations, the encoder 104 and decoder 112 may be implemented on the same electronic device. For example, the decoder 112 may be a hypothetical reference decoder (HRD). In an implementation where the encoder 104 and decoder 112 are implemented on the same electronic device, for instance, the bitstream 110 may be made available to the decoder in a variety of ways. For example, the bitstream 110 may be provided over a bus to the decoder 112 or stored in memory for retrieval by the decoder 112. The decoder 112 may be implemented in hardware, software or a combination of both. In one configuration, the decoder 112 may be a HEVC decoder.

In some configuration, the decoder 112 may include a file parser 155. For example, the file parser 155 may be an ISO Base media file format parser. The file parser 155 may receive the file 151 and obtain the file data. Once the file data is obtained, the decoder 112 may process the data in the same way as received bitstream data described below.

As illustrated in FIG. 1, the STSA sample grouping receiving module 120 and the file parser 155 may be part of the decoder 112. In some configurations, the STSA sample grouping receiving module 120 and the file parser 155 may be separate from the decoder 112. For example, the STSA sample grouping receiving module 120 and/or the file parser 155 may be located on separate electronic devices 102 from the decoder 112.

The decoder 112 may obtain (e.g., receive) the bitstream 110 and/or a file 151. The decoder 112 may generate one or more decoded pictures 114 based on the bitstream 110 and/or the file 151.

A decoded picture 114 may include one or more decoded pictures and may be displayed, played back, stored in memory and/or transmitted to another device, etc. The decoder 112 may include a STSA sample grouping receiver module 120. The STSA sample grouping receiver module 120 may enable electronic device B 102*b* to obtain a STSA sample grouping from the bitstream 110. The STSA samples in the sample grouping may assist the decoder 112 in decoding a decoded picture 114. A STSA sample may include a set of NAL units that are consecutive in decoding order used to decode the coded picture 114.

Electronic device B 102*b* may also perform one or more operations on the bitstream 110 and/or the file 151. In one example, an operation or process performed on the bitstream 110 and/or the file 151 may be based on whether a STSA sample grouping is present. In some configurations, the decoder 112 or other element on electronic device B 102*b* may perform the operation on the bitstream 110 and/or the file 151. Furthermore, other operations may also be performed on the bitstream 110 and/or the file 151.

In some configurations, the electronic device B 102*b* may output a decoded picture 114. In one example, the decoded picture 114 may be transmitted to another device or back to electronic device A 102*a*. In one configuration, the decoded picture 114 may be stored or otherwise maintained on electronic device B 102*b*. In another configuration, the electronic device B 102*b* may display the decoded picture 114. In yet another configuration, the decoded picture 114 may include elements of the input picture 106 with different properties based on the encoding and other operations performed on the bitstream 110. In some configurations, the decoded picture 114 may be included in a picture and/or sample stream with a different resolution, format, specifications or other attribute from the input picture 106.

It should be noted that one or more of the elements or parts thereof included in the electronic device(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application specific integrated circuit (ASIC), a large-scale integrated circuit (LSI) or integrated circuit, etc.

Figure 2:
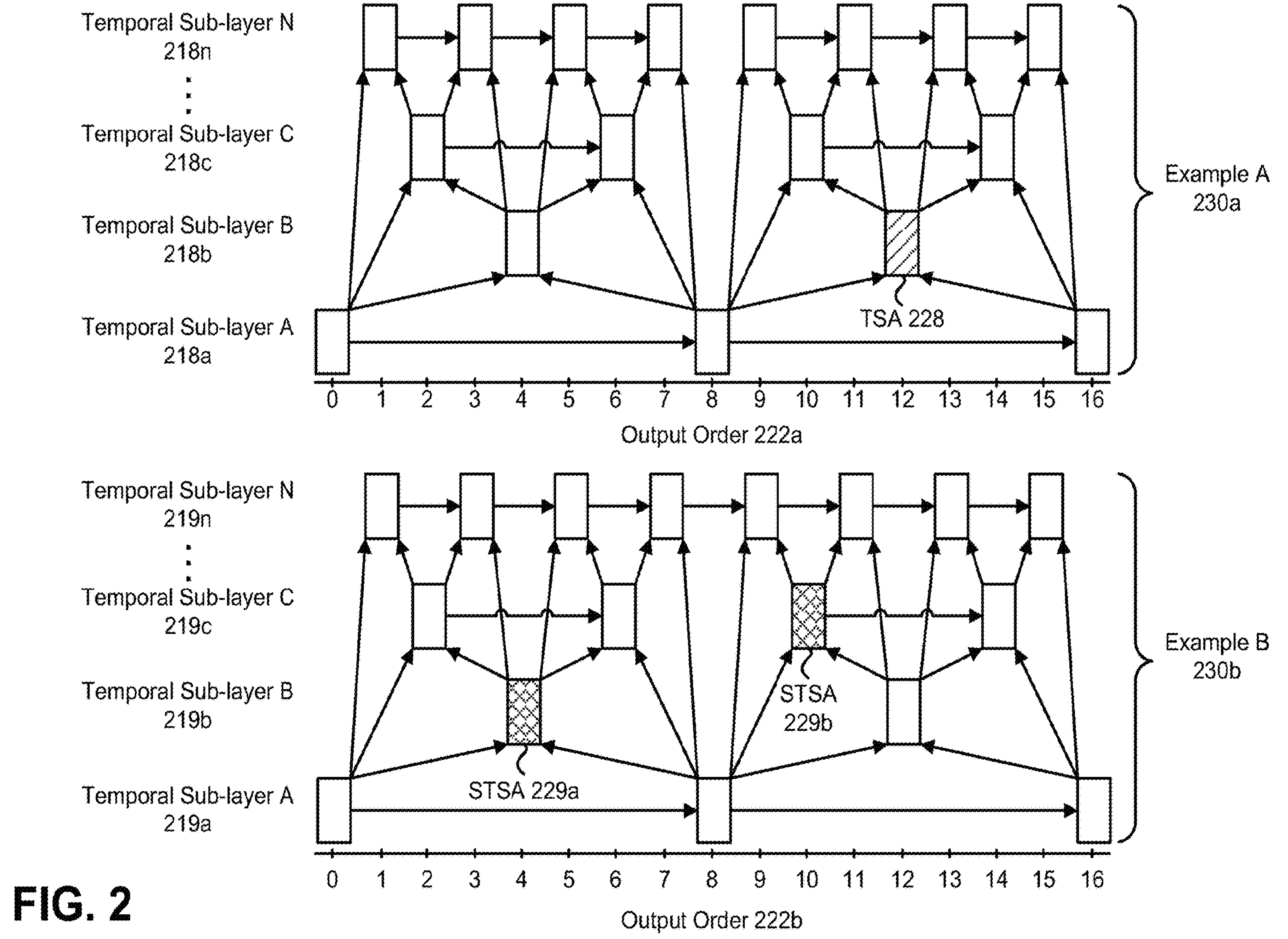
FIG. 2 is a block diagram illustrating two examples of a coding structure.

FIG. 2 is a block diagram illustrating two examples of a coding structure. Example A 230*a* illustrates a coding structure when using a temporal sub-layer access (TSA) picture 228. In some cases the temporal layer access picture may be called temporal sub-layer access (TSA) picture. Example B 230*b* illustrates a coding structure when using one or more step-wise temporal sub-layer access (STSA) pictures 229*a-b*.

The horizontal access in example A 230*a* represents the output order 222*a* of pictures in a coding structure. The output order may start at zero and count upwards (e.g., from left to right) and may identify corresponding pictures in the code structure. By way of example, example A 230*a* has an output order 222*a* from 0-16 that corresponds to pictures 0-16, respectively.

In example A 230*a*, the vertical access represents temporal layers 218 (e.g., temporal sub-layers or sub-layers). Each temporal layer 218*a-n* may include one or more pictures. Each picture on the same temporal layer 218 may have the same temporal identifier. For example, all pictures on temporal layer A 218*a* may have temporal_id equal to zero, all pictures on temporal layer B 218*b* may have temporal_id equal to one, all pictures on temporal layer C 218*c* may have temporal_id equal to two, all pictures on temporal layer N 218*n* may have temporal_id equal to N−1, etc.

As shown in example A 230*a*, there may be a number of temporal layers 218*a-n*. For example, there may be two, three, four, eight, sixteen, etc. temporal layers 218. In the case of HEVC base specification, there may be up to 8 temporal layers. Each temporal layer 218 may include a different number of pictures. In some configurations, temporal layers 218 are organized in a hierarchal form. Each higher temporal layer 218, above the base layer (e.g., temporal layer A 218*a*), may include more pictures than the preceding lower temporal layers 218. For example, temporal layer N 218*n* may include twice as many pictures as temporal layer C 218*c*, and temporal layer C 218*c* may include twice as many pictures as temporal layer B 218*b*. Higher temporal layers 218 with greater number of pictures may provide higher frame rates for decoded pictures 114. Thus, a greater number of pictures may be decoded at a higher temporal layer 218.

Each temporal layer 218 may have a variety of picture types, slice types and sample grouping types. For example, temporal layer A 218*a* may have a picture with an intra-prediction slice (I-slice) and a picture with a predictive slice (P-slice). Temporal layer C 218*c* may have pictures with bi-predictive slices (B-slices). Temporal layer B 218*b* may have pictures with P-slices and pictures with B-slices.

In example A 230*a*, a TSA picture 228 is shown. For example the TSA picture 228 may be the 12th picture in the output order 222*a*. A TSA picture may be a Clean Random Access (CRA) pictures and/or a temporal layer switching point.

The electronic device 102 may use a temporal layer switching functionality indicated by a TSA picture 228 to switch between temporal layers 218. For example, the electronic device 102 may use a temporal layer switching point to indicate a switch between temporal layer A 218*a* and temporal layer B 218*b* or any temporal layer above temporal layer B (i.e. temporal layer C, . . . , temporal layer N) Thus, the electronic device 102 may start decoding any higher temporal layers at the TSA picture 228.

Example B 230*b* illustrates a coding structure when using one or more step-wise temporal sub-layer access (STSA) pictures 229*a-b*. The STSA pictures 229*a-b* may be staggered between temporal layers 219. In other words, the STSA pictures 229*a-b* may be located on different temporal layers. For example, STSA picture 229*a* may be on temporal layer B 219*b*, and STSA picture 229*b* may be on temporal layer C 219*c*. In example B 230*b* of FIG. 2, STSA 229*a* and STSA 229*b* are shown in the output order 222 as pictures 4 and 10, respectively.

A STSA picture 229 may be a picture that is associated with a STSA sample group. For example, the STSA picture 229 may be a coded picture associated with a set of NAL units that are consecutive in decoding order.

Example B 230*b* includes temporal layers 219*a-n* and an output order 222*b* similar to corresponding temporal layers 218*a-n* and output order 222 a described in connection with example A 230*a* of FIG. 2. Example B 230*b* may have pictures outputted in an output order 222*b* of 0-16, for example.

Each temporal layer 219*a-n* may include one or more pictures. Each picture on the same temporal layer 219 may have the same temporal identifier. For example, all pictures on temporal layer B 219*b* may have the same temporal_id. The temporal layers 219*a-n* may be organized in a hierarchical manner with each higher temporal layer 219, above the base layer (e.g., temporal layer A 219*a*), having more pictures than lower temporal layers 219. For example, temporal layer N 219*n* may have eight pictures while temporal layer B 218*b* may have two pictures. Higher temporal layers 219 with greater number of pictures may provide higher frame rates for decoded pictures.

In example B 230*b*, STSA pictures 229*a-b* are shown. For example, the STSA picture 229 a may be the 4th picture in the output order 222*b*. A STSA picture coded structure with a STSA sample grouping may provide clear markings and/or labeling of STSA samples as belonging to the STSA sample grouping. For example, the STSA picture 229 may indicate when a next temporal layer switching point will occur at the same temporal layer (e.g., temporal layer B 219*b*). This may be beneficial in determining when to adaptively switch to a new temporal layer.

While decoding pictures from temporal layer A 219*a* and temporal layer B 219*b*, the electronic device 102 may receive an indication of a STSA picture 229*b*. The STSA picture 229 b may indicate a step-wise temporal sub-layer switching point to the electronic device 102. At this point, the electronic device 102 may start receiving temporal layer C 219*c* pictures (or stop discarding temporal layer C 219*c* pictures) and may start decoding temporal layer A 219*a*, temporal layer B 219*b* and temporal layer C 219*c* pictures. In this manner, the electronic device 102 may determine when to adaptively switch to a new temporal layer 219 when the electronic device 102 receives the STSA picture 229*b*.

Further, the STSA picture 229 may indicate when a next temporal layer up switching point (i.e., STSA sample for higher temporal ID such as temporal layer C 219*c*) will occur at the higher temporal layer. This may be beneficial in allowing selection of desired frame rate in a step-by-step manner and for temporal up-switching.

For example, using STSA pictures 229 among multiple temporal layers 219 allows for selection of desired frames in a step-by-step manner. For instance, a full frame rate may be represented by "F" Hertz (Hz). In this example, temporal layers 219*a-n* are all used and each temporal layer 219*a-n* may represent a different frame rate. Temporal layer A 219*a*, temporal layer B 219*b*, temporal layer C 219*c* and temporal layer N 219*n* may have temporal IDs of 0, 1, 2 and 3 respectively. A full frame rate uses all the temporal layers 219. In other words, the full frame rate, F Hz, employs all pictures having temporal_id equal to 0, 1, 2 or 3. By way of example, this may include all 16 pictures shown in example B 230*b*.

However, in some instances, a substream (i.e., a subset of frames or less than the full frame rate) may be used. For instance, a substream using only temporal_ids 0, 1 and 2 may use half of the full frame rate, represented by F/2 Hz. For example, this may include all the pictures in temporal layer A 219*a* through temporal layer C 219*c* shown in example B 230*b*, or 8 pictures.

A substream using only temporal_ids 0 and 1 may use a fourth of the full frame rate, represented by F/4 Hz. For example, this may include all the pictures in temporal layer A 219*a* through temporal layer B 219*b* shown in example B 230*b*, or 4 pictures.

A substream using only temporal_id 0 may use an eighth of the full frame rate, represented by F/8 Hz. For example, this may include only pictures in in temporal layer A 219*a* shown in example B 230*b*, or 2 pictures.

In some configurations, available bandwidth may determine if the full frame rate (e.g., F Hz) or a partial frame rate, (e.g., F/2 Hz, F/4 Hz, F/8 Hz) may be transmitted by an electronic device 102. As such, each temporal layer 219*a-n* and corresponding temporal identifier may be transmitted separately as its own multicast group.

In some configurations, the lowest frame rate (e.g., F/8 Hz) is transmitted first as a multicast group. Additionally, higher frame rates (e.g., F/4 Hz, F/2 Hz and F Hz) may be transmitted as additional multicast groups, respectively. For example, an electronic device 102 may start receiving a bitstream 110 including a multicast group substream (F/8 Hz) with only temporal layer A 219*a* pictures (e.g., temporal_id=0). Subsequently, the bitstream 110 may start to additionally include a multicast group substream (F/4 Hz) with temporal layer A 219*a* and temporal layer B 219*b* pictures (e.g., temporal_ids=1 and 2). However, the electronic device 102 cannot immediately start decoding the temporal layer B 219*b* pictures. Rather, the electronic device 102 must discard the temporal layer B 219*b* pictures.

While receiving pictures from temporal layer A 219*a* and temporal layer B 219*b*, the electronic device 102 may receive an indication of a STSA picture 229*a*. For example, the indication may be a NAL unit type or a sample grouping indication of STSA indicating a STSA picture 229*a*. The STSA picture 229*a* may indicate a step-wise temporal sub-layer switching point to the electronic device 102. As this point, the electronic device 102 may start decoding both temporal layer A 219*a* and temporal layer B 219*b* pictures.

The electronic device 102 may continue to receive picture from additional temporal layers 219, such as pictures in temporal layer C 219*c* and temporal layer N 219*n*. Along with the additional temporal layers 219, the electronic device 102 may receive additional STSA pictures 229, such as STSA picture 229*b*, to indicate additional step-wise temporal sub-layer switching points. As such, the electronic device 102 may switch to a full frame rate, F Hz, using STSA pictures 229 as step-wise temporal sub-layer switching points. Thus, in this manner, STSA pictures 229 allow for selection of desired frame rates in a step-by-step manner.

Figure 3:
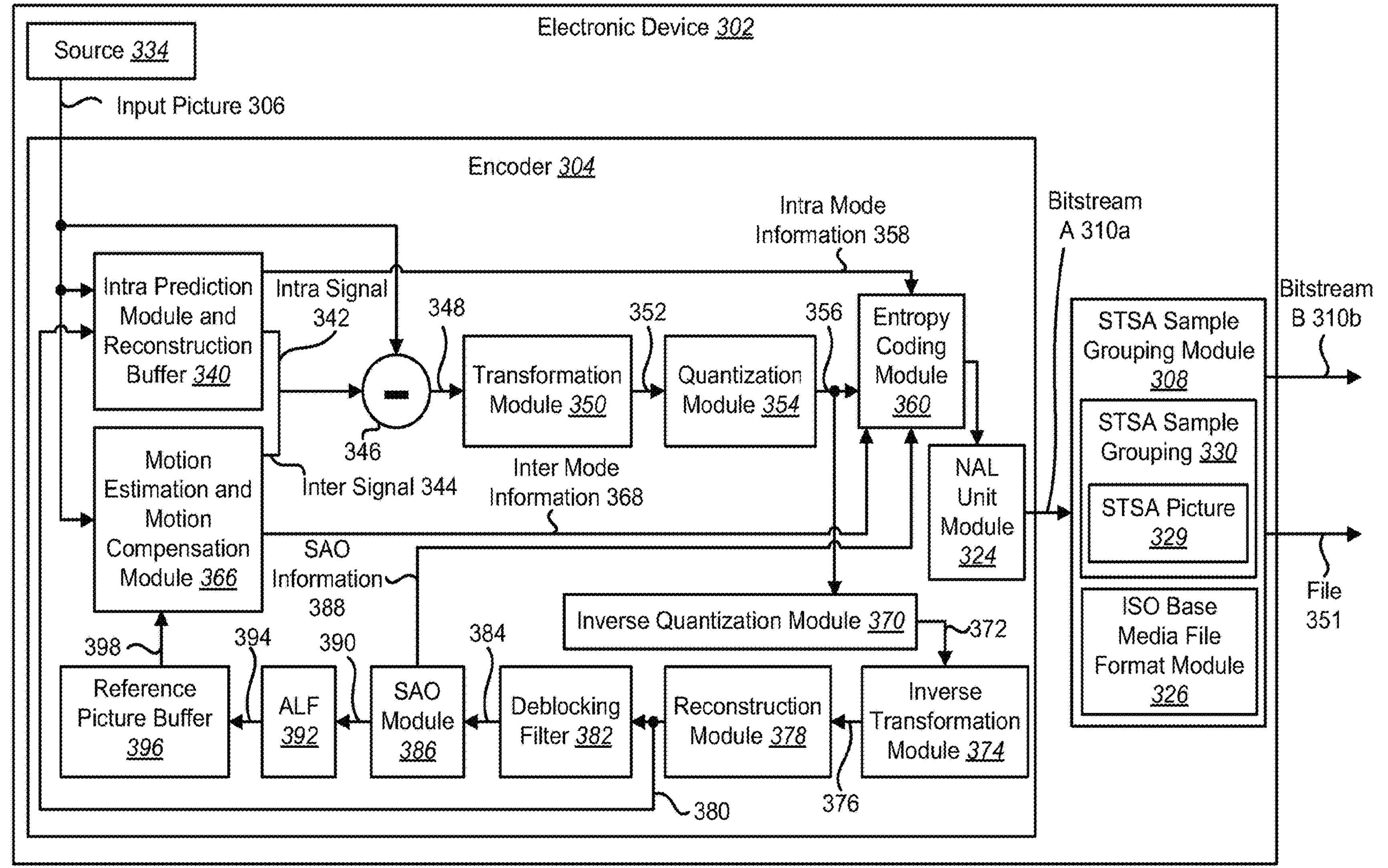
FIG. 3 is a block diagram illustrating one configuration of an encoder on an electronic device.

FIG. 3 is a block diagram illustrating one configuration of an encoder 304 and a STSA sample grouping module 308 on an electronic device 302. The electronic device 302 may be one example of the electronic device 102 described in connection with FIG. 1 above. For example, the electronic device 302 and encoder 304 may correspond to the electronic device A 102*a* and encoder 104 of FIG. 1. As illustrated in FIG. 3, the STSA sample grouping module 308 may be separate from the encoder 304. In other configurations, the STSA sample grouping module 308 may be part of the encoder 304.

One or more of the elements illustrated as included within the electronic device 302 may be implemented in hardware, software or a combination of both. The electronic device 302 may include encoder 304, which may be implemented in hardware, software or a combination of both. The encoder 304 may be implemented as a circuit, integrated circuit, application-specific integrated circuit (ASIC), processor in electronic communication with memory with executable instructions, firmware, field-programmable gate array (FPGA), etc., or a combination thereof. In some configurations, the encoder 304 may be a HEVC coder. The encoder 304 may code based on the ISO base media file format.

The electronic device 302 may include a source 334. The source 334 may provide picture or image data (e.g., video) as an input picture 306 to the encoder 304. Examples of the source 334 may include image sensors, memory, communication interfaces, network interfaces, wireless receivers, ports, etc.

One or more input pictures 306 may be provided to an intra-frame prediction module and reconstruction buffer 340. An input picture 306 may also be provided to a motion estimation and motion compensation module 366 and to a subtraction module 346.

The intra-frame prediction module and reconstruction buffer 340 may generate intra mode information 358 and an intra signal 342 based on one or more input pictures 306 and reconstructed data 380. The motion estimation and motion compensation module 366 may generate inter mode information 368 and an inter signal 344 based on one or more input pictures 306 and a reference picture buffer 396 reference picture buffer output signal 398. In some configurations, the reference picture buffer 396 may include data from one or more reference pictures in the reference picture buffer 396.

The encoder 304 may select between the intra signal 342 and the inter signal 344 in accordance with a mode. The intra signal 342 may be used in order to exploit spatial characteristics within a picture in an intra coding mode. The inter signal 344 may be used in order to exploit temporal characteristics between pictures in an inter coding mode. While in the intra coding mode, the intra signal 342 may be provided to the subtraction module 346 and the intra mode information 358 may be provided to an entropy coding module 360. While in the inter coding mode, the inter signal 344 may be provided to the subtraction module 346 and the inter mode information 368 may be provided to the entropy coding module 360.

Either the intra signal 342 or the inter signal 344 (depending on the mode) is subtracted from an input picture 306 at the subtraction module 346 in order to produce a prediction residual 348. The prediction residual 348 is provided to a transformation module 350. The transformation module 350 may compress the prediction residual 348 to produce a transformed signal 352 that is provided to a quantization module 354. The quantization module 354 quantizes the transformed signal 352 to produce transformed and quantized coefficients (TQCs) 356.

The TQCs 356 are provided to an entropy coding module 360 and an inverse quantization module 370. The inverse quantization module 370 performs inverse quantization on the TQCs 356 to produce an inverse quantized signal 372 that is provided to an inverse transformation module 374. The inverse transformation module 374 decompresses the inverse quantized signal 372 to produce a decompressed signal 376 that is provided to a reconstruction module 378.

The reconstruction module 378 may produce reconstructed data 380 based on the decompressed signal 376. For example, the reconstruction module 378 may reconstruct (modify) pictures. The reconstructed data 380 may be provided to a deblocking filter 382 and to the intra prediction module and reconstruction buffer 340. The deblocking filter 382 may produce a filtered signal 384 based on the reconstructed data 380.

The filtered signal 384 may be provided to a sample adaptive offset (SAO) module 386. The SAO module 386 may produce SAO information 388 that is provided to the entropy coding module 360 and an SAO signal 390 that is provided to an adaptive loop filter (ALF) 392. The ALF 392 produces an ALF signal 394 that is provided to the reference picture buffer 396. The ALF signal 394 may include data from one or more pictures that may be used as reference pictures.

The entropy coding module 360 may code the TQCs 356 and provide output to a NAL unit module to produce a bitstream A 310*a* or other signal. Also, the entropy coding module 360 may code the TQCs 356 using Context-Adaptive Variable Length Coding (CAVLC) or Context-Adaptive Binary Arithmetic Coding (CABAC). In particular, the entropy coding module 360 may code the TQCs 356 based on one or more of intra mode information 358, inter mode information 368 and SAO information 388.

In some configurations, the NAL unit module 324 may generate a set of NAL units. For example, the NAL units may be used for decoding a coded picture, such as a STSA picture. For instance, the NAL unit module 324 may associate NAL units with type values of 5 and/or 6 (as shown in Table 1 above) with a STSA picture 329.

In some configurations, the bitstream A 310*a* may include coded picture data. In one example, the bitstream A 310*a* is passed to a STSA sample grouping module 308 prior to being sent from the electronic device 302 or to another electronic device 102 as bitstream B 110*b*.

Quantization, involved in video compression such as HEVC, is a lossy compression technique achieved by compressing a range of values to a single quantum value. The quantization parameter (QP) is a predefined scaling parameter used to perform the quantization based on both the quality of reconstructed video and compression ratio. The block type is defined in HEVC to represent the characteristics of a given block based on the block size and its color information. QP, resolution information and block type may be determined before entropy coding. For example, the electronic device 302 (e.g., the encoder 304) may determine the QP, resolution information and block type, which may be provided to the entropy coding module 360.

The entropy coding module 360 may determine the block size based on a block of TQCs 356. For example, block size may be the number of TQCs 356 along one dimension of the block of TQCs. In other words, the number of TQCs 356 in the block of TQCs may be equal to block size squared. For instance, block size may be determined as the square root of the number of TQCs 356 in the block of TQCs. Resolution may be defined as a pixel width by a pixel height. Resolution information may include a number of pixels for the width of a picture, for the height of a picture or both. Block size may be defined as the number of TQCs 356 along one dimension of a 2D block of TQCs.

In some configurations, a STSA sample grouping module 308 is included in the electronic device 302. The STSA sample grouping module 308 may provide a structuring and grouping mechanism to indicate the identification of access units as STSA samples.

The NAL unit module 324 may send bitstream A 310*a* or another signal including one or more pictures to the STSA sample grouping module 308. The STSA sample grouping module 308 may process a STSA sample grouping 330 along with a corresponding STSA picture 329. In this case, the intra-frame prediction module and reconstruction buffer 340, the transformation module 350, the quantization module 354, the entropy coding module 360 and the motion estimation and motion compensation module 366 have encoded the STSA picture 329 such that the set of NAL units that are consecutive in decoding order are associated with the STSA picture 329 in the STSA sample grouping 330.

In some configurations, the STSA sample grouping module 308 may generate a set of NAL unit types in connection with a coded input picture 306. The coded input picture 306 may be a coded STSA picture 329.

Further, the STSA sample grouping module 308 may modify or create a set of NAL unit types to send with a bitstream B 310*b* or file (not shown), which may be stored on the electronic device 302 or be sent to another electronic device 102. A STSA sample grouping 330 may also include one or more samples. The samples may be STSA samples. Each STSA sample in the STSA sample grouping 330 may include a corresponding STSA picture 329.

In this manner, a clear marking and/or labeling of a STSA samples may be provided to the other electronic device 102. Further, the STSA sample grouping 330 may provide allow for easy identification of temporal layer switching points in the samples.

The STSA sample grouping module 308 may further include a variety of modules or sub-modules for generating one or more STSA sample groupings 330 associated with an input picture 306. For example, the STSA sample grouping module 308 may include an ISO base media file format module 326 or other modules for generating a STSA picture 329 and/or with a STSA sample grouping 330 associated with an input picture 306.

The ISO base media file format module 326 may assist the STSA sample grouping module 308 to structure STSA sample groupings 330. The ISO base media file format module 326 may provide other modules with ISO base media file format information. For example, the ISO base media file format module 326 may provide ISO base media file formatting to the NAL unit module 324.

As another example, the ISO base media file format module 326 may provide ISO base media file formatting to various modules in the encoder 304 to allow for the ISO base media file formatting to extend to HEVC encoding. In this manner, the encoder 304 may signal HEVC STSA samples by using ISO base media file formatting.

In some configurations, the bitstream B 310*b* or file (not shown) may be transmitted to another electronic device 102. For example, the bitstream B 310*b* or file 351 may be provided to a communication interface, network interface, wireless transmitter, port, etc. For instance, the bitstream B 310*b* or file 351 may be transmitted to another electronic device 102 via LAN, the Internet, a cellular phone base station, etc. The bitstream B 310*b* or file 351 may additionally or alternatively be stored in memory or other components on the electronic device 302.

Figure 4:
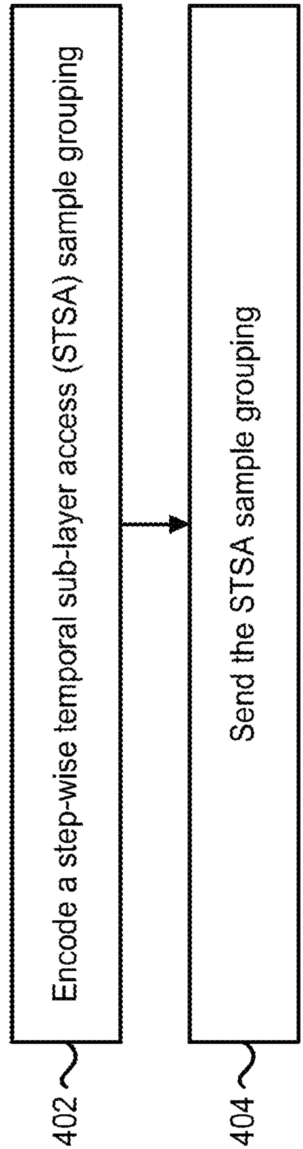
FIG. 4 is a flow diagram illustrating one configuration of a method for signaling a step-wise temporal sub-layer access (STSA) sample grouping.
Figure 4:

FIG. 4 is a flow diagram illustrating one configuration of a method 400 for signaling a step-wise temporal sub-layer access (STSA) sample grouping. An electronic device 302 may encode 402 a STSA sample grouping 330. The STSA sample grouping 330 may correspond to an input picture 306 or one of a stream of input pictures 306 obtained by an electronic device 302.

Encoding 402 the STSA sample grouping 330 may include representing an input picture 306 as digital data. For example, encoding 402 the STSA sample grouping 330 may include generating a string of bits that represent characteristics (e.g., color, luminance, spatial location, etc.) of an input picture 306. In some cases, an input picture 306 may be encoded as a STSA picture 329. One or more encoded STSA pictures 329 and/or sample groupings 330 may be included in the bitstream 310 and may be sent to another electronic device 102 that includes a decoder 112.

The electronic device 302 may send 404 the STSA sample grouping 330. Sending 404 the STSA sample grouping 330 may include transferring data (e.g., a bitstream 310 or file 351) between components of an electronic device 102 or transmitting a bitstream 310 or file 351 between one or more electronic devices 102. In the case of a file 351, the STSA sample groupings may be stored in a file 351 and the file 351 may be sent 404 to an electronic device 102.

In one example, an encoder 304 on electronic device 302 may send a bitstream 310 including one or more STSA pictures 329 and/or one or more sample groupings 330 to an electronic device 102. In some configurations, the bitstream 310 may be sent to a decoder 112 on electronic device B 102*b*. The STSA sample grouping 330 may be structured in an ISO base media file format and may be sent in a NAL unit carriage, for example.

Figure 5:
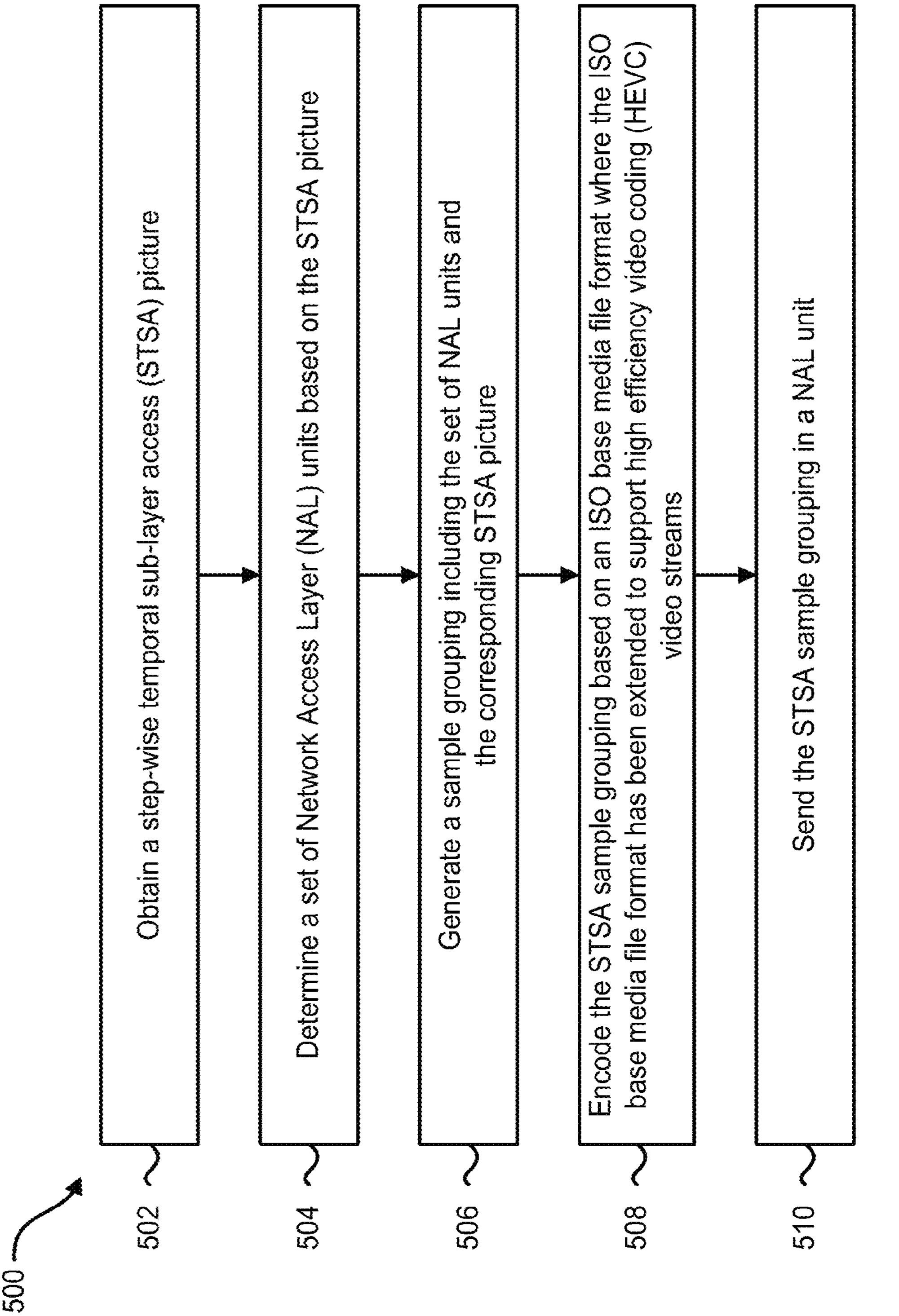
FIG. 5 is a flow diagram illustrating a more specific configuration of a method for signaling a step-wise temporal sub-layer access (STSA) sample grouping.

FIG. 5 is a flow diagram illustrating a more specific configuration of a method 500 for signaling a step-wise temporal sub-layer access (STSA) sample grouping. An electronic device 302 may obtain 502 a STSA picture 329. For example, the input picture 306 may be a STSA picture 329. The electronic device 302 may determine 504 a set of NAL units based on the STSA picture 504.

The electronic device 302 may generate 506 a sample grouping 330 including the set of NAL units and the corresponding STSA picture 329. An electronic device 302 may encode 508 a STSA sample grouping 330 based on (e.g., using) the ISO base media file format where the ISO base media file format has been extended to support HEVC video streams. For example, the electronic device 302 may encode an input picture 306 as a STSA picture 329 corresponding to the STSA sample grouping 330. The electronic device 302 may encode 508 the STSA picture 329, as described above in connection with FIG. 4.

In some configurations, the STSA sample grouping 330 may also include a type TSA flag. The type TSA flag may indicate if a sample in the sample grouping 330 is a TSA sample or a STSA sample. The type TSA flag may be typeTSAFlag. For example, typeTSAFlag equal to 1 may indicate that a sample grouping is a TSA sample. Otherwise, typeTSAFlag equal to 0 may indicate that the sample grouping is a STSA sample.

The encoded STSA picture and/or the corresponding STSA sample grouping 330 may be structured in an ISO base media file format. For example, Table 2 to Table 4 provide examples of ISO base media file format syntax that may be used to structure STSA sample groupings 330 in ISO base media file format, such as using a sample group description box (SGPD). For instance, Table 3 shows an example of a step-wise temporal sub-layer sample group entry. In Table 3, a sample group may be used to mark STSA samples.

In some configurations, the STSA sample grouping 330 may indicate a desired frame rate in a step-by-step manner and for temporal up-switching. For example, the STSA sample grouping 330 may provide additional syntax that provides for the ability to know when a next temporal layer up switching point (i.e., STSA sample for a higher temporal ID) will occur at the higher temporal layer. In some configurations, the STSA sample grouping 330 may indicate all higher temporal layers with a temporal ID greater than the temporal ID of temporal layer of the sample.

In some configurations, the STSA sample grouping 330 may indicate when to adaptively switch to a new temporal layer. For example, the STSA sample grouping 330 may provide additional syntax that provides for the ability to know when a next temporal layer switching point will occur at the same temporal layer.

The ISO base media file format may also be extended to support HEVC video streams. In this manner, STSA sample groupings 330 may be formatted in an ISO base media file format while still incorporating the benefits and functionality of HEVC.

The electronic device 302 may send 510 the STSA sample grouping 330. For example, the STSA sample grouping 330 may be sent in a NAL unit carriage. The NAL unit carriage may include a set of NAL units that are in consecutive decoding order and may include one coded picture. For example, the NAL unit carriage may include a coded STSA picture 329.

Sending the STSA sample groupings 330 may include transferring data (e.g., a bitstream 310 or file 351) between components of an electronic device 102 or transmitting a bitstream 310 and/or file 351 between one or more electronic devices 102. Further, sending 510 a STSA sample grouping 330 may include other similar approaches for transferring data between one or more electronic devices 102. In the case of sending a file 351, the STSA sample groupings in a NAL unit may be stored in a file 351 and the file 351 may be sent 510 to an electronic device 102.

Figure 6:
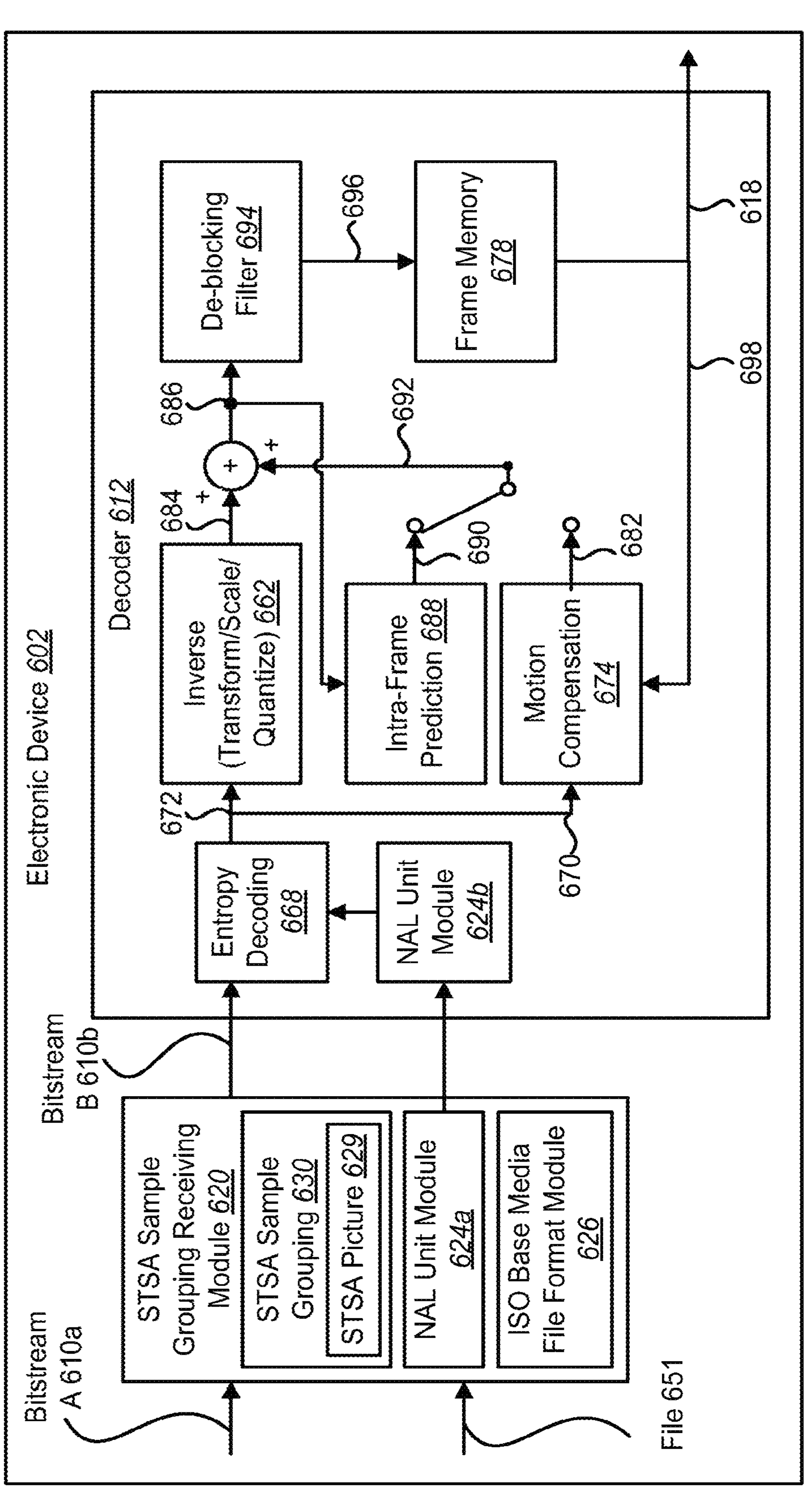
FIG. 6 is a block diagram illustrating one configuration of a decoder on an electronic device.

FIG. 6 is a block diagram illustrating one configuration of a decoder 612 and a STSA sample grouping receiving module 620 on an electronic device 602. The electronic device 602 and the decoder 612 may be one example of the electronic device 102 and decoder 112 described in connection with FIG. 1. As illustrated in FIG. 6, the STSA sample grouping receiving module 620 may be separate from the decoder 612. In other configurations, the STSA sample grouping receiving module 620 may be part of the decoder 612.

The electronic device 612 may receive a bitstream 610. For example, the STSA sample grouping receiving module 620 may receive bitstream A 610*a* and/or file 651. It should be noted that while FIG. 6 refers to an electronic device 602 receiving and processing data from a bitstream 610, the electronic device 602 may similarly receive and process data from a file 651. For example, the file 651 may include the bitstream data, stored in ISO base media file format.

In one configuration, the bitstream A 610*a* and/or file 651 may include or be accompanied by one or more STSA sample groupings 630. The STSA sample grouping 630 may include a corresponding STSA picture 629. The STSA sample grouping receiving module 620 may provide a structuring and grouping mechanism to indicate the identification of access units as STSA samples, for example, to the decoder 612.

In another configuration, the electronic device 602 receives a bitstream A 610*a* and/or file 651 and sends the bitstream A 610*a* and/or file 651 through the STSA sample grouping receiving module 620 to produce a bitstream B 610*b*. The STSA sample grouping receiving module 620 may obtain a STSA sample grouping 630. The sample grouping 630 may include a coded picture and a set of NAL units used by the decoder 612 to decode the coded picture. The coded picture may be a coded STSA picture 629.

STSA sample grouping receiving module 620 may identify marked and/or labeled STSA samples obtained at the electronic device 602. The STSA sample grouping 630 may also allow for easy identification of temporal layer switching points in the samples.

The STSA sample grouping receiving module 620 may include a variety of modules or sub-modules for receiving a STSA picture 629 and or a sample grouping 630 from the bitstream 610 and/or file 651. For example, the STSA sample grouping receiving module 620 may include a NAL unit module 624, an ISO base media file format module 626 or other modules, for receiving a sample grouping 630 and/or a STSA picture 629 from the bitstream 610 and/or file 651, prior to passing through certain elements of the decoder 612. The STSA sample grouping receiving module 620 may also include a STSA sample grouping 330 and/or a STSA picture 629 which may be decoded by the decoder 612.

In some configurations, the NAL unit module 624 may assist the decoder 612 in obtaining NAL unit types from the bitstream A 610*a* and/or file 651. For example, a set of NAL units may be associated with a STSA picture 629.

In one configuration, the NAL unit module 624 may receive the set of NAL units and provide the NAL unit types to the decoder 612. In some instances, the NAL unit module 624 may provide NAL unit types to a NAL unit module 624*a* located within the decoder 612. For example, the NAL unit module 624 may obtain NAL units with type values of 5 and/or 6 (as shown in Table 1 above) in connection with a received coded STSA picture 629 and provide the NAL unit values to NAL unit module 624*a*.

The NAL unit module 624 may also obtain a NAL unit carriage used to transport data relating to the STSA sample grouping 630 and/or STSA picture 629. For example, the STSA sample groupings 630 may be structured in an ISO base media file format and received in the bitstream 610 and/or file 651 in a carriage of a NAL unit.

The ISO base media file format module 626 may assist the STSA sample grouping receiving module 620 in obtaining STSA sample groupings 630. One or more received sample groupings may be structured in an ISO base media file format.

The ISO base media file format module 626 may also provide other modules with ISO base media file format information. For example, the ISO base media file format module 626 may provide ISO base media file formatting to the NAL unit module 624 to assist the NAL unit module 624 in obtaining NAL unit types. As another example, the ISO base media file format module 626 may provide ISO base media file formatting to various modules in the decoder 612 to allow the ISO base media file formatting to be extended to HEVC decoding. In this manner, the decoder 612 may decode HEVC STSA samples by using ISO base media file formatting.

The decoder 612 may be included in an electronic device 602. For example, the decoder 612 may be a HEVC decoder and/or an ISO base media file format parser. For instance, the decoder 612 may also decode HEVC files based on the ISO base media file format. The decoder 612 and/or one or more of the elements illustrated as included in the decoder 612 may be implemented in hardware, software or a combination of both.

The decoder 612 may receive a bitstream B 610*b* (e.g., one or more encoded pictures included in the bitstream B 610*b*) from the STSA sample grouping receiving module 620. It should be noted that bitstream B 610*b* from the STSA sample grouping receiving module 620 includes picture data received by the electronic device 602 as bitstream A 610*a* and/or a file 651. In other words, bitstream B 610*b* data may be based on data obtained from bitstream A 610*a* and/or a file 651.

In some configurations, the received bitstream B 610*b* may include received overhead information, such as a received slice header, received PPS, received buffer description information, etc. The encoded pictures included in the bitstream B 610*b* may include one or more encoded reference pictures and/or one or more other encoded pictures.

Received symbols (in the one or more encoded pictures included in the bitstream B 610*b*) may be entropy decoded by an entropy decoding module 668, thereby producing a motion information signal 670 and quantized, scaled and/or transformed coefficients 672.

The motion information signal 670 may be combined with a portion of a reference frame signal 698 from a frame memory 678 at a motion compensation module 674, which may produce an inter-frame prediction signal 682. The quantized, descaled and/or transformed coefficients 672 may be inverse quantized, scaled and inverse transformed by an inverse module 662, thereby producing a decoded residual signal 684. The decoded residual signal 684 may be added to a prediction signal 692 to produce a combined signal 686. The prediction signal 692 may be a signal selected from the inter-frame prediction signal 682 produced by the motion compensation module 674 or alternatively the intra-frame prediction signal 690 produced by an intra-frame prediction module 688. In some configurations, this signal selection may be based on (e.g., controlled by) the bitstream 610 and/or file 651.

The intra-frame prediction signal 690 may be predicted from previously decoded information from the combined signal 686 (in the current frame, for example). The combined signal 686 may also be filtered by a de-blocking filter 694. The resulting filtered signal 696 may be written to frame memory 678. The resulting filtered signal 696 may include a decoded picture.

The frame memory 678 may include overhead information corresponding to the decoded pictures. For example, the frame memory 678 may include slice headers, parameter information, cycle parameters, buffer description information, etc. One or more of these pieces of information may be signaled from an encoder (e.g., encoder 104). The frame memory 678 may provide a decoded picture 618 or other output signal.

In some configurations, the decoder 612 may include a NAL unit module 624*b*. The NAL unit module 624*b* may receive NAL unit information from the NAL unit module 624 located in the STSA sample grouping receiving module 620. The NAL unit module 624*b* may provide the NAL unit information to the entropy decoding module 668 or another component in the decoder 612. The NAL unit information from the NAL unit module 624*b* may assist the decoder 612 in decoding encoded pictures.

Figure 7:
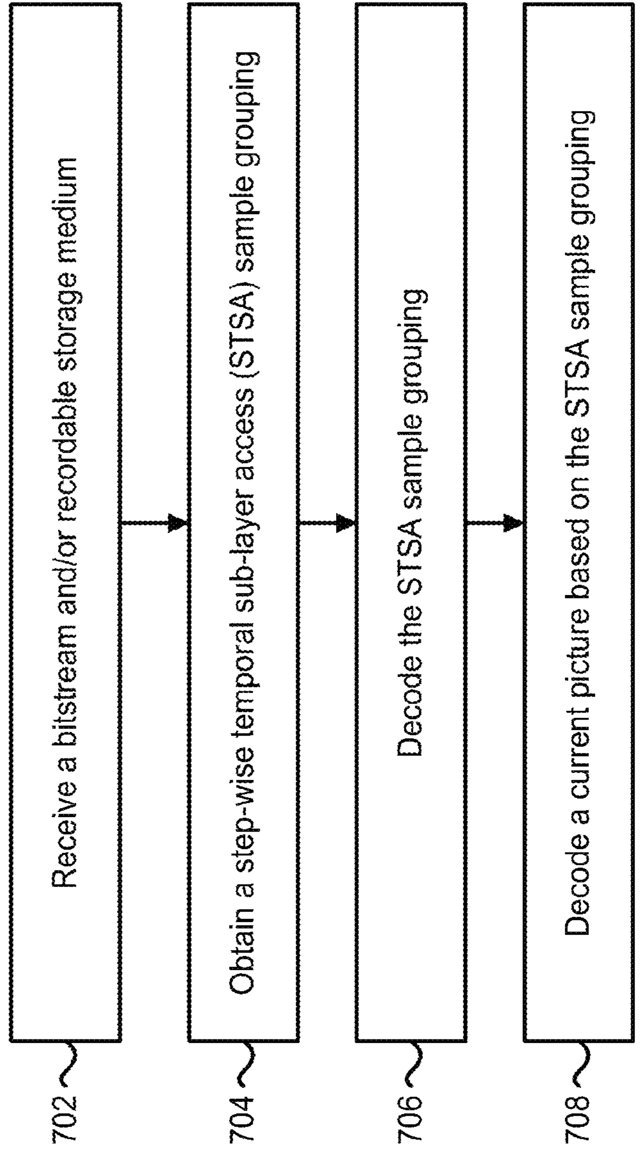
FIG. 7 is a flow diagram illustrating one configuration of a method for receiving a step-wise temporal sub-layer access (STSA) sample grouping.

FIG. 7 is a flow diagram illustrating one configuration of a method 700 for receiving a step-wise temporal sub-layer access (STSA) sample grouping. An electronic device 602 may receive 702 a bitstream 610 and/or recordable storage medium, such as a file 651. Receiving 702 the bitstream 610 and/or file 651 may include obtaining, reading or otherwise accessing a bitstream 610. In some configurations, the bitstream 610 and/or file 651 may be received from an encoder 104 on the same electronic device or on a different electronic device 102. For example, the electronic device B 102*b* may receive the bitstream 110 and/or file 651 from an encoder 104 on electronic device A 102*a*.

In some configurations, the electronic device 602 may include a decoder 612 that receives the bitstream 610 and/or file 651. The bitstream 610 and/or file 651 may include encoded data based on one or more input pictures 106.

The electronic device 602 may obtain 704 a STSA sample grouping 630. The STSA sample grouping 630 may include one or more samples. The electronic device 602 may obtain the STSA sample grouping 630 from the bitstream 610 and/or file 651. In other words, the bitstream 610 and/or file 651 may include a STSA sample grouping 630. The STSA sample grouping 630 may include a set of NAL units and a corresponding coded STSA picture 629.

The electronic device 602 may decode 706 the STSA sample grouping 630. For example, the decoder 612 may decode 706 a portion of the bitstream 610 and/or file 651 to produce a sample grouping 630. As described above, STSA sample groupings 630 may provide clear markings and/or labeling of STSA samples as belonging to the STSA sample grouping 630. In this manner, the electronic device 602 may easily identify the temporal layer switching points in STSA samples.

The electronic device 602 may decode 708 a current picture based on the STSA sample grouping 630. For example, the decoder 612 may decode 708 a portion of the bitstream 610 and/or file 651 to produce a current picture based on the STSA sample grouping 630. In some cases, the current picture that is decoded may be a STSA picture 629. The current picture may be decoded by a decoder 612 as described above.

FIG. 8 is a flow diagram illustrating a more specific configuration of a method 800 for receiving a step-wise temporal sub-layer access (STSA) sample grouping. An electronic device 602 may receive 802 a bitstream 610 and/or file 651. The bitstream 610 and/or file 651 may be received as described above in connection with FIG. 7. For example, the electronic device B 102 may receive 802 the bitstream 610 and/or file 651 from the encoder 104 on electronic device A 102*a*.

The electronic device 602 may obtain 804 a STSA sample grouping 630. The electronic device 602 may obtain the STSA sample grouping 630 from a bitstream 610 and/or file 651. In other words, the bitstream 610 and/or file 651 10 may include a STSA sample grouping 630. The STSA sample grouping 630 may include one or more samples.

In some configurations, the sample grouping 630 may be structured in an ISO base media file format such as a NAL unit carriage. The electronic device 602 may receive the NAL unit carriage and obtain the sample grouping 630. Table 2 to Table 4 provide examples of ISO base media file format syntax that the sample groupings 630 may be structure as when received in ISO base media file format such as using a sample group description box (SGPD). For instance, Table 3 shows an example of a step-wise temporal sub-layer sample group entry. In Table 3, a sample group may be used to mark STSA samples.

The electronic device 602 may obtain 806 a set of NAL units and a corresponding coded STSA picture 629 from the STSA sample grouping 630. The set of NAL units and the corresponding coded STSA picture 629 may be packed in the sample grouping 630. The set of NAL units may be in consecutive in decoding order.

In some configurations, the electronic device 602 may obtain a type TSA flag. For instance, the STSA sample grouping 630 may also include a type TSA flag. The type TSA flag may indicate if a sample in the STSA sample grouping 630 is a TSA sample or a STSA sample. The type TSA flag may be typeTSAFlag. For example, typeTSAFlag equal to 1 may indicate that a sample grouping is a TSA sample. Otherwise, typeTSAFlag equal to 0 may indicate that the sample grouping is a STSA sample.

The electronic device 602 may decode 808 the corresponding coded STSA picture 629 based on the set of NAL units in the STSA sample grouping 630. The electronic device 602 may also receive indications from the STSA sample grouping 630 corresponding to temporal sub-layer switching. For instance, the STSA sample grouping 630 may indicate a desired frame rate in a step-by-step manner and for temporal up-switching. As other example, the STSA sample grouping 630 may provide additional syntax that provides for the ability to know when a next temporal layer up switching point (i.e., STSA sample for a higher temporal ID) will occur at the higher temporal layer. In some configurations, the STSA sample grouping 630 may indicate when all higher temporal layers with a temporal ID greater than the temporal ID of temporal layer of the sample will occur. In each of these examples and configurations, the STSA sample grouping 630 may indicate and include one or more STSA samples.

The electronic device 602 may decode 810 a current picture based on the STSA picture 629. For example, the decoder 612 may decode 810 a portion of the bitstream 610 and/or file 651 to produce a current picture based on the STSA picture 629.

When the current picture is an STSA picture 629, there may be no picture included in Ref PicSetStCurrBefore, Ref PicSetStCurrAfter or RefPicSetLtCurr that has Temporal_id equal to that of the current picture. When the current picture is a picture that follows, in decoding order, an STSA picture 629 that has Temporal_id equal to that of the current picture, there may be no picture that has Temporal_id equal to that of the current picture included in RefPicSetStCurrBefore, RefPicSetStCurrAfter or Ref PicSetLtCurr that preceded the STSA picture in decoding order.

Figure 9:
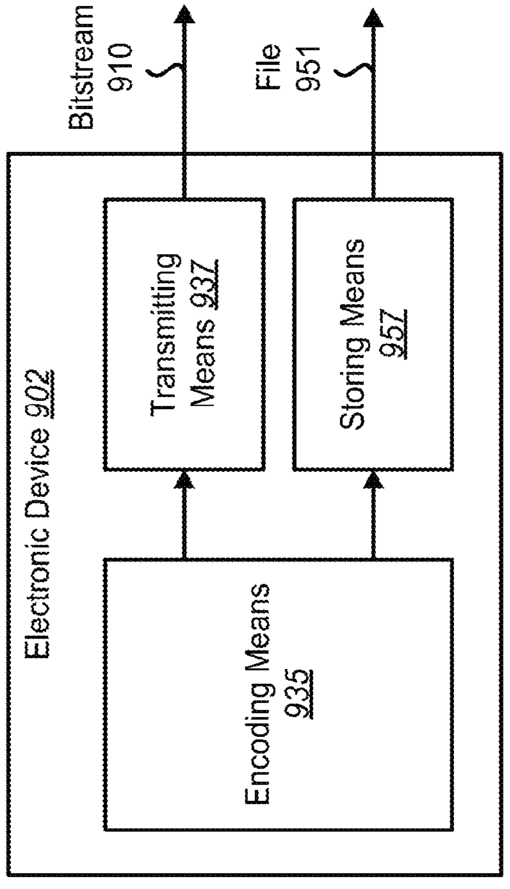
FIG. 9 is a block diagram illustrating one configuration of an electronic device in which systems and methods for signaling a step-wise temporal sub-layer access (STSA) sample grouping may be implemented.
Figure 11:
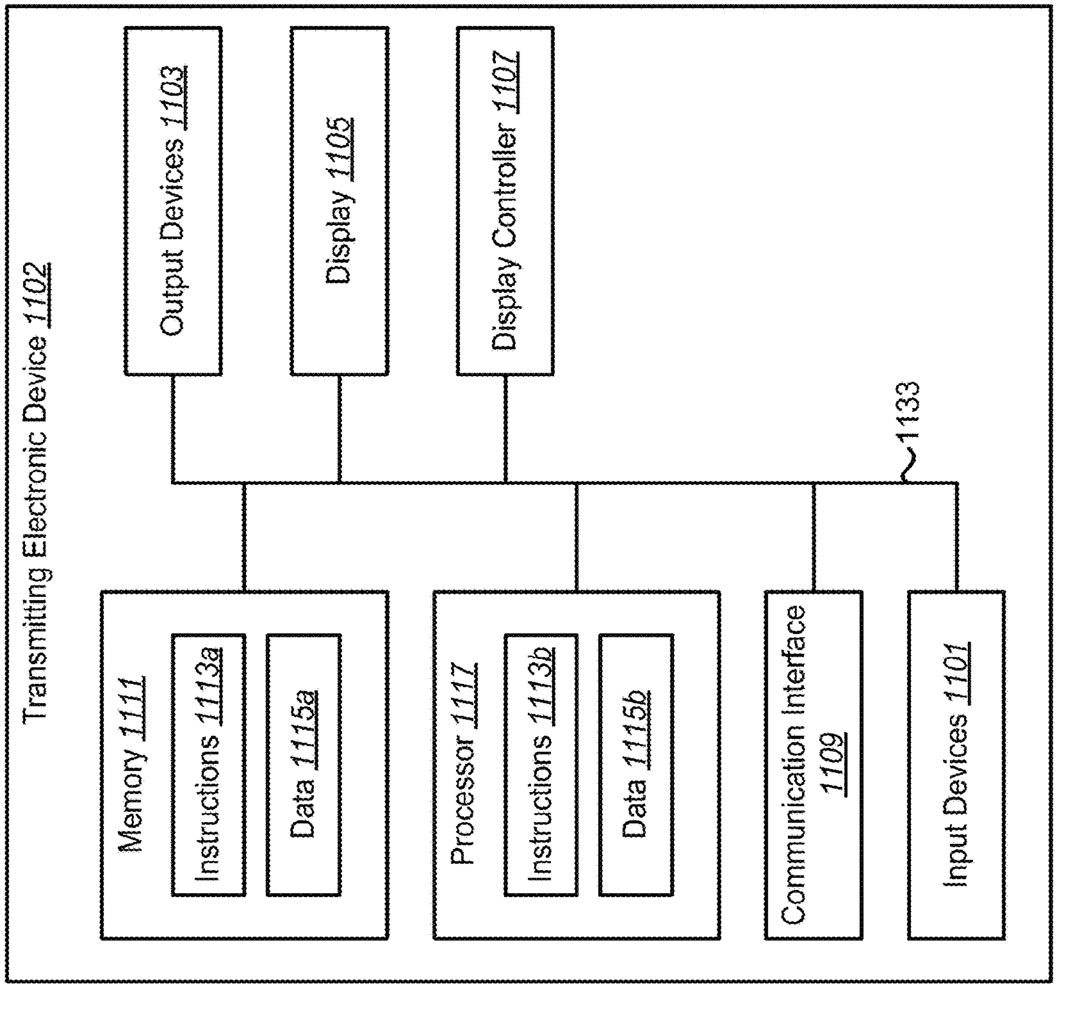
FIG. 11 is a block diagram illustrating various components that may be utilized in a transmitting electronic device.

As described above, STSA sample groupings 630 and/or STSA pictures 629 may allow the decoder 612 to store and use additional reference pictures when decoding a current picture. Employing STSA sample groupings 630 may provide clear markings and/or labeling of STSA samples as belonging to the STSA sample grouping. In this manner, the electronic device 602 may easily identify the temporal layer switching points in the samples FIG. 9 is a block diagram illustrating one configuration of an electronic device 902 in which systems and methods for signaling a step-wise temporal sub-layer access (STSA) sample grouping may be implemented. The electronic device 902 may include a bitstream 910 a file 951, encoding means 935, transmitting means 937 and storing means 957. The encoding means 935, transmitting means 937 and storing means 957 may be configured to perform one or more functions described in connection with one or more of FIG. 4, FIG. 5 and other figures described herein. FIG. 11 below illustrates one example of a concrete apparatus structure of FIG. 9. Other various structures may be implemented to realize one or more of the functions of FIG. 1 and FIG. 3. For example, a DSP may be realized by software.

Figure 10:
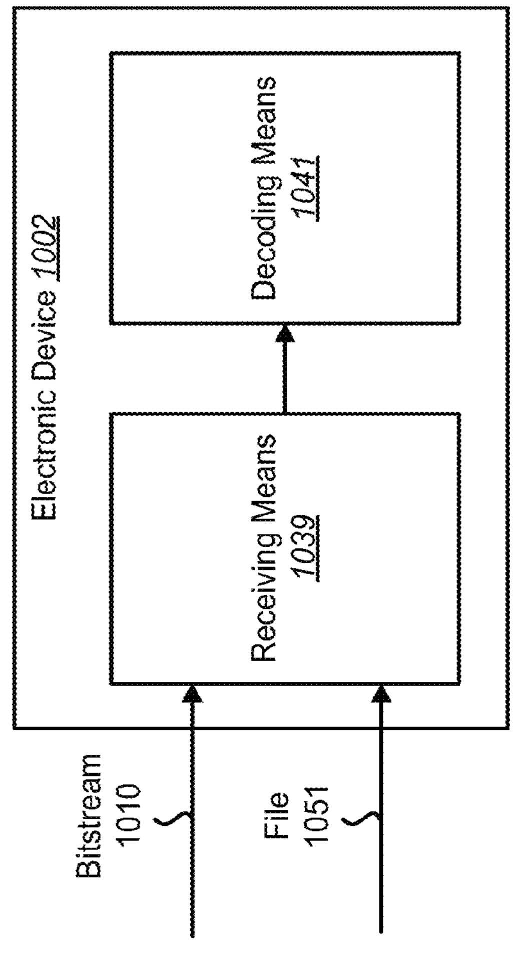
FIG. 10 is a block diagram illustrating one configuration of an electronic device in which systems and methods for receiving a step-wise temporal sub-layer access (STSA) sample grouping may be implemented.
Figure 12:
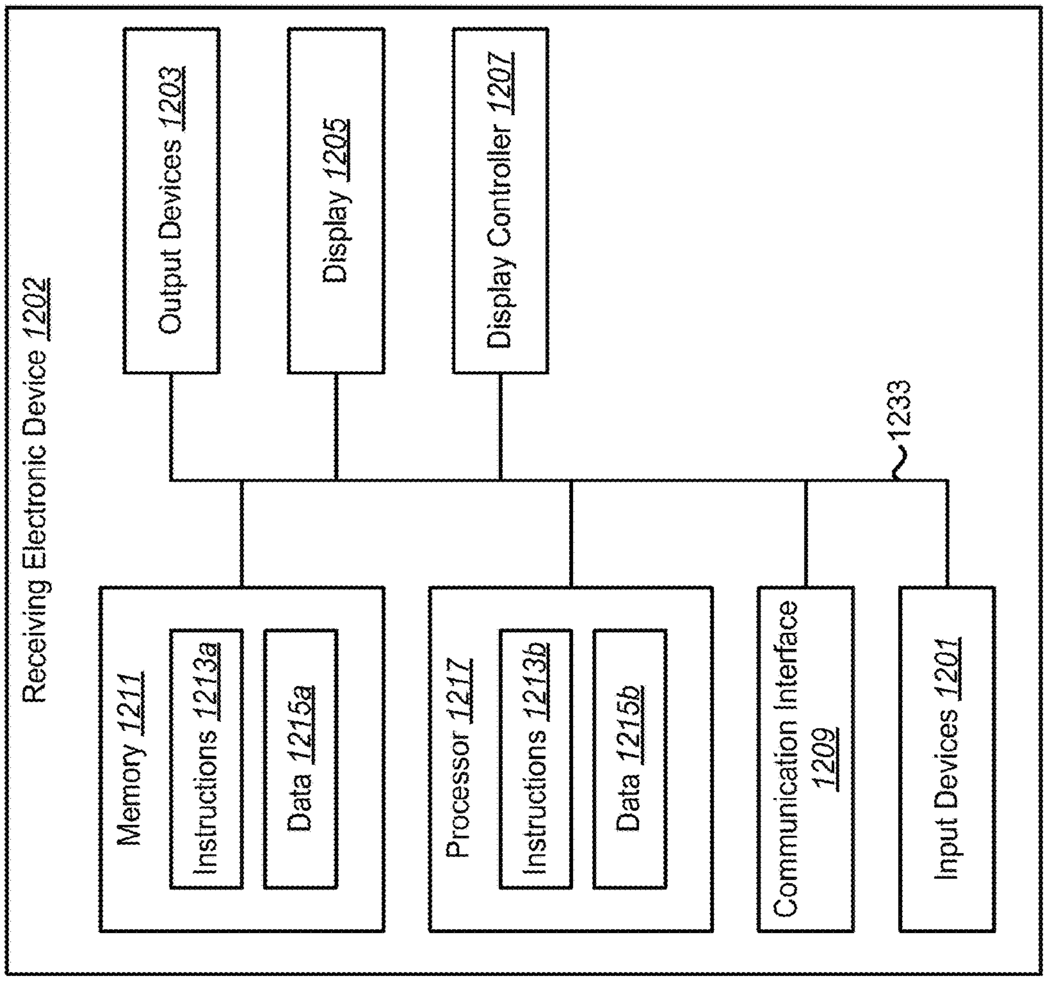
FIG. 12 is a block diagram illustrating various components that may be utilized in a receiving electronic device.

FIG. 10 is a block diagram illustrating one configuration of an electronic device 1002 in which systems and methods for receiving a step-wise temporal sub-layer access (STSA) sample grouping may be implemented. The electronic device 1002 may include a bitstream 1010 a file 1051, receiving means 1039 and decoding means 1041. The receiving means 1039 and decoding means 1041 may be configured to perform one or more similar functions described in connection with FIG. 7, FIG. 8 and other figures described herein. FIG. 12 below illustrates one example of a concrete apparatus structure of FIG. 10. Other various structures may be implemented to realize one or more functions of FIG. 1 and FIG. 6. For example, a DSP may be realized by software.

FIG. 11 is a block diagram illustrating various components that may be utilized in a transmitting electronic device 1102. One or more of the electronic devices 102, 302, 602, 902 and 1002 described herein may be implemented in accordance with the transmitting electronic device 1102 illustrated in FIG. 11.

The transmitting electronic device 1102 includes a processor 1117 that controls operation of the transmitting electronic device 1102. The processor 1117 may also be referred to as a Computer Processing Unit (CPU). Memory 1111, which may include both read-only memory (ROM), random access memory (RAM) or any type of device that may store information, provides instructions 1113 a (e.g., executable instructions) and data 1115 a to the processor 1117. A portion of the memory 1111 may also include non-volatile random access memory (NVRAM). The memory 1111 may be in electronic communication with the processor 1117.

Instructions 1113*b* and data 1115*b* may also reside in the processor 1117. Instructions 1113*b* and/or data 1115*b* loaded into the processor 1117 may also include instructions 1113*a* and/or data 1115*a* from memory 1111 that were loaded for execution or processing by the processor 1117. The instructions 1113*b* may be executed by the processor 1117 to implement one or more of the methods 400 and 500 disclosed herein.

The transmitting electronic device 1102 may include one or more communication interfaces 1109 for communicating with other electronic devices (e.g., receiving electronic device). The communication interfaces 1109 may be based on wired communication technology, wireless communication technology or both. Examples of a communication interface 1109 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, a wireless transceiver in accordance with 3rd Generation Partnership Project (3GPP) specifications and so forth.

The transmitting electronic device 1102 may include one or more output devices 1103 and one or more input devices 1101. Examples of output devices 1103 include a speaker, printer, etc. One type of output device that may be included in a transmitting electronic device 1102 is a display device 1105. Display devices 1105 used with configurations disclosed herein may utilize any suitable image projection technology, such as a cathode ray tube (CRT), liquid crystal display (LCD), light-emitting diode (LED), gas plasma, electroluminescence or the like. A display controller 1107 may be provided for converting data stored in the memory 1111 into text, graphics and/or moving images (as appropriate) shown on the display device 1105. Examples of input devices 1101 include a keyboard, mouse, microphone, remote control device, button, joystick, trackball, touchpad, touchscreen, lightpen, etc.

The various components of the transmitting electronic device 1102 are coupled together by a bus system 1133, which may include a power bus, a control signal bus and a status signal bus, in addition to a data bus. However, for the sake of clarity, the various buses are illustrated in FIG. 11 as the bus system 1133. The transmitting electronic device 1102, illustrated in FIG. 11, is a functional block diagram rather than a listing of specific components.

FIG. 12 is a block diagram illustrating various components that may be utilized in a receiving electronic device 1202. One or more of the electronic devices 102, 302, 602, 902 and 1002 described herein may be implemented in accordance with the receiving electronic device 1202 illustrated in FIG. 12.

The receiving electronic device 1202 includes a processor 1217 that controls operation of the receiving electronic device 1202. The processor 1217 may also be referred to as a CPU. Memory 1211, which may include both read-only memory (ROM), random access memory (RAM) or any type of device that may store information, provides instructions 1213*a* (e.g., executable instructions) and data 1215*a* to the processor 1217. A portion of the memory 1211 may also include non-volatile random access memory (NVRAM). The memory 1211 may be in electronic communication with the processor 1217.

Instructions 1213*b* and data 1215*b* may also reside in the processor 1217. Instructions 1213*b* and/or data 1215*b* loaded into the processor 1217 may also include instructions 1213*a* and/or data 1215*a* from memory 1211 that were loaded for execution or processing by the processor 1217. The instructions 1213*b* may be executed by the processor 1217 to implement one or more of the methods 700 and 800 disclosed herein.

The receiving electronic device 1202 may include one or more communication interface 1209 for communicating with other electronic devices (e.g., transmitting electronic device). The communication interfaces 1209 may be based on wired communication technology, wireless communication technology or both. Examples of a communication interface 1209 include a serial port, a parallel port, a Universal Serial Bus (USB), an Ethernet adapter, an IEEE 1294 bus interface, a small computer system interface (SCSI) bus interface, an infrared (IR) communication port, a Bluetooth wireless communication adapter, a wireless transceiver in accordance with 3rd Generation Partnership Project (3GPP) specifications and so forth.

The receiving electronic device 1202 may include one or more output devices 1203 and one or more input devices 1201. Examples of output devices 1203 include a speaker, printer, etc. One type of output device that may be included in a receiving electronic device 1202 is a display device 1205. Display devices 1205 used with configurations disclosed herein may utilize any suitable image projection technology, such as a cathode ray tube (CRT), liquid crystal display (LCD), light-emitting diode (LED), gas plasma, electroluminescence or the like. A display controller 1207 may be provided for converting data stored in the memory 1211 into text, graphics, and/or moving images (as appropriate) shown on the display device 1205. Examples of input devices 1201 include a keyboard, mouse, microphone, remote control device, button, joystick, trackball, touchpad, touchscreen, lightpen, etc.

The various components of the receiving electronic device 1202 are coupled together by a bus system 1233, which may include a power bus, a control signal bus and a status signal bus, in addition to a data bus. However, for the sake of clarity, the various buses are illustrated in FIG. 12 as the bus system 1233. The receiving electronic device 1202 illustrated in FIG. 12 is a functional block diagram rather than a listing of specific components.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may include RAM, ROM, EEPROM, CD-ROM or other optical disk storage, magnetic disk storage or other magnetic storage devices or any other medium that can carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods or approaches described herein may be implemented in and/or realized using a chipset, an ASIC, a large-scale integrated circuit (LSI) or integrated circuit, etc.

Each of the methods disclosed herein includes one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods and apparatus described herein without departing from the scope of the claims.

What is claimed is:

1. A method for encoding a picture, the method comprising:

encoding a step-wise temporal sub-layer access (STSA) sample grouping that allows determining when to switch to a new temporal layer based on the STSA sample grouping, wherein the STSA sample grouping is a group of STSA samples, the STSA sample grouping comprises a next STSA upswitching distance parameter and a next STSA sample distance parameter, wherein the next STSA upswitching distance parameter is different from the next STSA sample distance parameter, wherein the next STSA sample distance parameter indicates a distance of a next temporal layer switching point in a current temporal layer, wherein the next STSA upswitching distance parameter indicates a distance of a next temporal layer up switching point in a temporal layer higher than the current temporal layer, and wherein a network access layer (NAL) unit type indicates whether a picture is a STSA picture; and wherein encoding the picture includes a transformation step and quantization step to produce transformed and quantized coefficients.

2. The method of claim 1, wherein the group of STSA samples are grouped in a sample group description box (SGPD).

3. The method of claim 1, wherein the STSA sample grouping comprises a type temporal switching access (TSA) flag.

4. The method of claim 3, wherein the type TSA flag value indicates if a sample in the STSA sample grouping is a TSA sample or a STSA sample.

5. The method of claim 1, wherein a STSA picture provides temporal layer switching functionality to a temporal layer to which the STSA picture belongs.

6. The method of claim 1, wherein the STSA sample grouping is included in an ISO base media file.

7. A method of transmitting a bitstream of an encoded picture, wherein the picture has been encoded by:

encoding a bitstream including a step-wise temporal sub-layer access (STSA) sample grouping that allows determining when to switch to a new temporal layer, wherein the STSA sample grouping is a group of STSA samples, wherein the STSA sample grouping comprises a next STSA upswitching distance parameter and a next STSA sample distance parameter, wherein the next STSA upswitching distance parameter is different from the next STSA sample distance parameter, wherein the next STSA sample distance parameter indicates a distance of a next temporal layer switching point in a current temporal layer, wherein the next STSA upswitching distance parameter indicates a distance of a next temporal layer up switching point in a temporal layer higher than the current temporal layer, and wherein a network access layer (NAL) unit type indicates whether a picture is a STSA picture; and wherein encoding the picture includes a transformation step and quantization step to produce transformed and quantized coefficients.

8. The method of claim 7, wherein the group of STSA samples are grouped in a sample group description box (SGPD).

9. The method of claim 7, STSA sample grouping comprises a type temporal switching access (TSA) flag.

10. The method of claim 9, wherein the type TSA flag value indicates if a sample in the STSA sample grouping is a TSA sample or a STSA sample.

11. The method of claim 7, wherein a STSA picture provides temporal layer switching functionality to a temporal layer to which the STSA picture belongs.

12. The method of claim 7, wherein the STSA sample grouping is included in an ISO base media file.

13. A method for decoding a picture, the method comprising:

receiving an audio-visual bitstream;

obtaining a step-wise temporal sublayer access (STSA) sample grouping;

decoding the STSA sample grouping; and determining when to switch to a new temporal layer based on the STSA sample grouping, wherein the STSA sample grouping is a group of STSA samples, wherein the STSA sample grouping comprises a next STSA upswitching distance parameter and a next STSA sample distance parameter, wherein the next STSA upswitching distance parameter is different from the next STSA sample distance parameter, wherein the next STSA sample distance parameter indicates a distance of a next temporal layer switching point in a current temporal layer, wherein the next STSA upswitching distance parameter indicates a distance of a next temporal layer up switching point in a temporal layer higher than the current temporal layer, and wherein a network access layer (NAL) unit type indicates whether a picture is a STSA picture; and wherein decoding the picture includes an inverse quantized and inverse transformation step to produce a decoded residual signal.

* * * * *